USOO5638281A

United States Patent [19]
Wang

[11] Patent Number: 5,638,281
[45] Date of Patent: Jun. 10, 1997

[54] TARGET PREDICTION AND COLLISION WARNING SYSTEM

[75] Inventor: C. David Wang, Melville, N.Y.

[73] Assignee: AIL Systems, Inc., Deer Park, N.Y.

[21] Appl. No.: 492,895

[22] Filed: Jun. 20, 1995

Related U.S. Application Data

[63] Continuation-in-part of Ser. No. 177,359, Jan. 3, 1994, which is a continuation-in-part of Ser. No. 648,194, Jan. 31, 1991, Pat. No. 5,276,772.

[51] Int. Cl.⁶ .............................. G01S 13/93; G01S 13/60; G06F 19/00
[52] U.S. Cl. .......................... 364/461; 364/516; 395/905; 342/29
[58] Field of Search ............................ 364/461, 516; 342/70, 71, 72, 29, 41, 82, 83; 180/167, 169; 395/90, 902, 905; 340/961, 436

[56] References Cited

U.S. PATENT DOCUMENTS

| 4,320,287 | 3/1982 | Rawicz | 235/412 |
|---|---|---|---|
| 4,760,604 | 7/1988 | Cooper et al. | 382/15 |
| 5,216,750 | 6/1993 | Smith | 395/24 |
| 5,268,692 | 12/1993 | Grosch et al. | 342/70 |
| 5,280,288 | 1/1994 | Sherry et al. | 342/83 |
| 5,302,956 | 4/1994 | Asbury et al. | 342/70 |
| 5,323,335 | 6/1994 | Mitchell | 364/572 |
| 5,325,096 | 6/1994 | Pakett | 342/70 |
| 5,408,414 | 4/1995 | Nomoto et al. | 364/449 |
| 5,471,214 | 11/1995 | Faibish et al. | 342/70 |

OTHER PUBLICATIONS

Lerro et al.; *Interacting Multiple Model Tracking With Target Amplitude Feature*; Apr. 1993; IEEE Trans. on Aerospace and Electronic Systems; vol. 29, No. 2; pp. 494–509.

*Primary Examiner*—Michael Zanelli
*Attorney, Agent, or Firm*—Hoffmann & Baron

[57] ABSTRACT

A device for target prediction and collision warning for tracking objects in a region proximate to a vehicle includes a signal transmitter which provides first and second detection signals for at least partial reflection by an object located in a spatial region. The device further includes a signal receiver for receiving the deflected first and second detection signals corresponding to first and second parameter signals. A Fourier transform circuit is provided for receiving the first and second object parameter signals and generating first and second Fourier transform object parameter signals corresponding to relative range and velocity data of a target being tracked. The device includes a probabilistic neural network which preferably sorts the first and second Fourier transform object parameter signals corresponding to the relative range and velocity of a target being tracked. Operatively coupled to the probabilistic neural network is a target tracker circuit which receives the sorted first and second Fourier transform object parameter signals after at least three samples of relative range and velocity data have been measured. The target tracker generates an output signal indicative of a prediction of regression parameters of a second order or higher order equation that characterizes the change in relative range and velocity of the target being tracked.

21 Claims, 7 Drawing Sheets

TARGET PREDICTION AND COLLISION WARNING SYSTEM

CROSS REFERENCE TO RELATED APPLICATION

This application is a continuation-in-part of copending U.S. patent application Ser. No. 08/177,359 filed Jan. 3, 1994, which is a continuation-in-part of U.S. patent application Ser. No. 07/648,194 filed Jan. 31, 1991, now U.S. Pat. No. 5,276,772 issued on Jan. 4, 1994, the disclosure of each of which is incorporated herein by reference.

BACKGROUND OF THE INVENTION

1. Field of the Invention

The present invention relates to vehicular radar systems, and more particularly, to a method and apparatus for improved vehicular collision avoidance by tracking the relative movement of an object and providing an operator of a vehicle an indication of the object's proximity to the vehicle.

2. Description of the Prior Art

Studies have shown that there is an ever-increasing number of vehicles traveling the nation's roadways. Correspondingly, these studies have shown that there is an increase in the likelihood of vehicular collisions with moving as well as stationary objects. For a number of years, automobiles have been sold with safety devices designed to help the occupants of a vehicle survive a collision. These safety items include high impact bumpers, high traction tires, seat-belts, air-bags, crumple-zones and side-impact protection systems. In addition to these safety items, additional features that assist in avoiding a collision such as anti-lock brakes are now commonly available. Safety devices have become an important selling point for automobile manufacturers and an important consideration for consumers. As important as these safety features have become, a reliable collision warning system that would substantially obviate the need for collision survival devices is yet to be developed.

Recent studies released by Mercedes-Benz have determined that at least sixty (60) percent of rear-end collisions, thirty (30) percent of head-on collisions and fifty (50) percent of intersection accidents could be avoided if the operator of the vehicle was provided at least one-half (0.5) second more "lead-time" before impact. In order to provide the additional lead-time, collision warning radar systems have been developed for incorporation in motor vehicles. The typical collision warning system operates by measuring the relative position, speed and direction of targets proximate the vehicle. The current systems are relatively unreliable and are often activated prematurely or at a time when the collision can not be avoided (i.e., just before impact). In addition, current collision warning systems are not commercially available because they are incapable of simultaneously reliably tracking numerous closely located objects (i.e., cars, highway dividers, trees, barriers, etc.) and of reliably determining if an object is becoming a greater or lesser danger.

Current state-of-the-art collision warning systems, such as that disclosed in U.S. Pat. No. 5,302,956, use scanning and digital signal processing (DSP) techniques to monitor the relative speed and range of a target based upon the frequency and phase difference of two distinct signals. Information relating to each target in the system's field of view is provided to a microcontroller which typically includes an audio warning unit. The microcontroller processes the frequency and phase information to determine if a condition exists that requires action on the part of the operator (i.e., if a target is close to the operator's vehicle). If a threatening condition exists, the audio warning unit is activated to alert the vehicle's operator. The extent of the audible warning is usually proportional to the degree of danger (i.e., the speed and proximity of the target to the vehicle).

A major disadvantage of the state of the art collision warning systems is that target drop outs due to maneuvering of a target out of the vehicle's field of view, measurement errors and signal noise are not taken into account. Specifically, the prior art systems do not monitor trends of each target's relative speed and range to match new speed and range readings. As a result, if a target being monitored moves out of the field of view of the radar or if mismeasurement occurs for even a small period of time, the previously stored data that is not associated with any new target data will be deleted. If the same target then reappears in the field of view, the new target data will not be associated with any previously recorded data because the new target data is substantially different from the previously stored data. Therefore, the system is not able to provide the operator with an indication of whether each target is becoming a greater or lesser threat to the vehicle. As a result, the current system will identify the new data as a new target not previously encountered.

The prior art collision warning systems are also deficient in that if a measurement error occurs when the target is in the vehicle's warning zone, the system will not provide the vehicle's operator with the necessary warning in order to avoid a collision. Furthermore, the prior art collision warning systems have limited use as accident reconstruction systems since they have only limited data storage capability. As a result, if the vehicle is involved in an accident and the operator does not remember to shut-off the data recording instrumentation, the relevant data for "off-line" accident reconstruction will be lost. Finally, the traditional collision warning systems do not have the capability to predict the future movements of each target and thus better anticipate when a dangerous condition might arise. Other deficiencies of the traditional collision warning systems are apparent to those skilled in the art.

OBJECTS AND SUMMARY OF THE INVENTION

It is therefore an object of the present invention to provide a target prediction and collision warning system that is capable of tracking a target that periodically leaves the system's field of view.

It is another object of the present invention to provide a target prediction and collision warning system that is capable of tracking a target even when data corresponding to target velocity and range is periodically corrupted with signal noise.

It is yet another object of the present invention to provide a target prediction and collision warning system that is capable of interpolating missing data during target tracking.

It is yet another object of the present invention to provide a target prediction and collision warning system that is capable of anticipating the future movements of targets in order to avoid traffic accidents prior to their occurrence.

It is a further object of the present invention to provide a target prediction and collision warning system that can reduce accident prediction error over prior art systems.

It is yet a further object of the present invention to provide a target prediction and collision warning system that is capable of compressing and storing data related to target speed and range.

It is still another object of the present invention to provide a target prediction and collision warning system that is capable of being used for accident reconstruction based on the storage of target speed and range data.

It is still a further object of the present invention to provide a target prediction and collision warning system which overcomes the inherent disadvantages of known target prediction and collision warning systems.

In accordance with one form of the present invention, a target prediction and collision warning system includes at least a signal transmitter, a signal receiver and a target tracker circuit for generating an output signal indicative of regression coefficients of a second or higher order polynomial expression that characterizes the change in relative range and velocity of an object being tracked as compared to a vehicle that has the system attached thereto.

The signal transmitter includes an input port for receiving first and second detection signals provided by a signal generator, and an output port for transmitting the first and second detection signals to a spatial region proximate the vehicle. Upon interaction with an object in the spatial region, at least partially reflected first and second detection signals are generated and are at least partially reflected toward the signal receiver.

The signal receiver is operatively coupled to the signal transmitter and includes an input port and an output port. The input port of the signal receiver is responsive to the at least partially reflected first and second detection signals which respectively correspond to first and second object parameter signals. The first and second object parameter signals, or modifications thereof, are thereafter provided to a Fourier transform circuit which is responsive to the first and second object parameter signals and generates respective first and second Fourier transform object parameter signals.

The Fourier transform circuit preferably converts the first and second object parameter signals from a time domain signal to a frequency domain signal to provide a spectrum of the intensity of the reflected first and second detection signals at specific time intervals. The first and second Fourier transform object parameter signals are provided to a velocity and range finder circuit which, based on the peak value of the first Fourier transform object parameter signal and the difference between the first and second Fourier transform object parameter signals at specific time intervals, determines the relative velocity and range of the object being monitored. The relative velocity and range information is preferably provided to an adaptive probabilistic neural network (APNN) which classifies (i.e., sorts) the relative range and velocity information (i.e., groups relative range and velocity data related to the same object) utilizing probability density function values.

Operatively coupled to the adaptive probabilistic neural network is a target tracker circuit which utilizes digital signal processing and recursive estimation to determine regression coefficients that fit a second or higher order polynomial that describes the relationship of relative range and velocity of the target being tracked. Based upon the regression coefficients, and by means of data extrapolation, the target tracker circuit can estimate missing range and velocity data due to target maneuvering in-and-out of the field of view of the radar and can predict relative range and velocity data of the target during a future time period in order to avoid a collision.

The target tracker circuit of the present invention includes a plurality of direct least squares determination circuits and a plurality of recursive least square determination circuits wherein each of the plurality of direct least squares determination circuits is coupled to a respective one of the plurality of recursive least square determination circuits. Each pair of recursive and direct least squares determination circuits receive signals from the APNN relating to the relative range and velocity data of one of the plurality of targets being tracked. In one embodiment of the invention, the plurality of direct least squares determination circuits receive data relating to a target only after at least three data samples relating to a target have been sorted by the APNN. In response to the at least three data samples, the direct least squares determination circuit generates an output signal indicative of an initial estimate of the regression parameters of a second or higher order equation.

The recursive least square determination circuit is operatively coupled to both the output of the direct least squares determination circuit and the APNN. The recursive least squares determination circuit receives the direct least squares output signal and at least four data sample signals from the APNN. The recursive least squares determination circuit iteratively updates the initial estimate of the regression parameters generated by the direct least squares determination circuit each time a new velocity and range data sample is provided. The regression parameters define the past, present and future relationship of the relative range and velocity of a target being tracked. The target tracker will individually calculate regression parameters for each target being tracked in parallel. Therefore, the system is capable of operating in real time.

A preferred form of the target prediction and collision warning system as well as other embodiments, objects, features and advantages of this invention, will be apparent from the following detailed description of illustrative embodiments thereof, which is to be read in connection with the accompanying drawings.

DETAILED DESCRIPTION OF THE PREFERRED EMBODIMENTS

Collision avoidance systems typically emit modulated, continuous radio waves at specific frequencies and measure the signals that are reflected off objects located in the region of signal transmission. The reflected radio wave signals are typically shifted in the frequency domain if the reflecting object is moving relative to the signal transmitter. The faster the monitored object (i.e., target) is traveling, the more the frequency of the reflected signal is shifted. A target traveling toward the system will increase the reflected signal frequency while a target traveling away from the system will decrease the reflected signal frequency as compared to the transmitted radio signal frequency.

Figure 1:
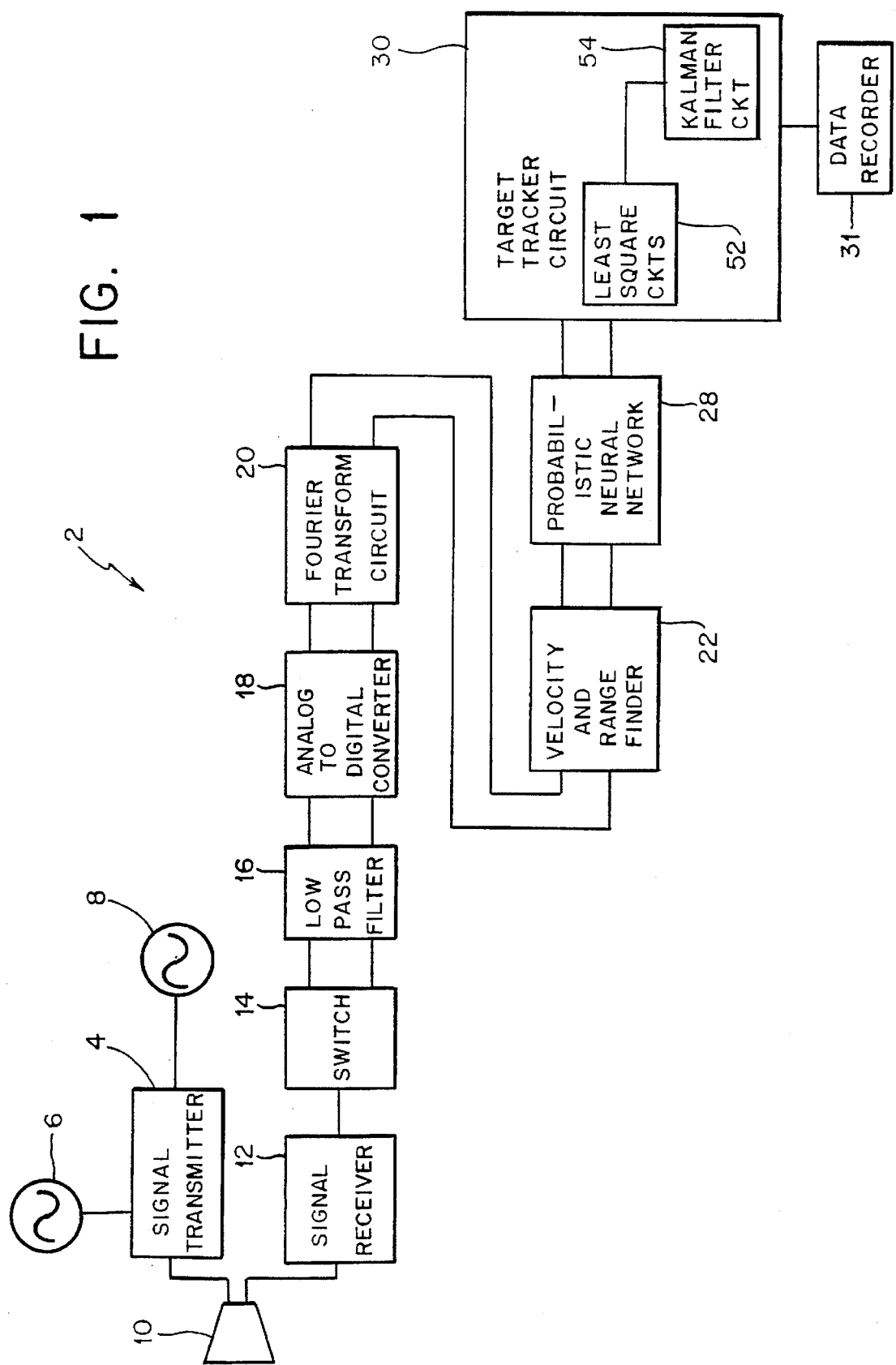
FIG. 1 is a block diagram of one form of an apparatus for target prediction and collision warning constructed in accordance with the present invention.

Referring now to FIG. 1 of the drawings, a target prediction and collision warning system for detection of objects in a spatial region constructed in accordance with the present invention will now be described. The apparatus 2 may be placed at a variety of locations on a motor vehicle such as the front, side or rear of the vehicle. However, in the preferred form of the invention, the apparatus is affixed at the front of the vehicle.

The apparatus for target prediction and collision warning 2 includes a signal transmitter 4, operatively coupled to first and second signal generators 6,8. The signal transmitter 4 preferably includes first and second input ports which receive first and second detection signals respectively provided by the first and second signal generators, and at least one output port. The first and second detection signals produced by the signal generators preferably have substantially distinct signal frequencies. In one embodiment, the frequencies of the first and second detection signals are separated by approximately 250 kHz.

The signal generators utilized in the present invention may preferably be Gunn oscillators or dielectric resonant oscillators such as Part No. DE2011 manufactured by GEC Plessy Semiconductors of the United Kingdom. The signal generators may also include an amplifier (not shown) to increase the power of the first and second detection signals before transmission. Alternatively, the signal transmitter 4 may include an amplifier, or amplifiers may be coupled between the first signal generator 6 and the signal transmitter 4 or between the second signal generator 8 and the signal transmitter 4. As is known in the art, the signal transmitter 4 preferably combines the signals provided by the signal generators 6, 8 and simultaneously transmits the first and second detection signals as a combined radio frequency (rf) signal.

The target prediction and collision warning system 2 also preferably includes an antenna 10 operatively coupled to the signal transmitter 4 for providing the combined rf signal. The combined rf signal provided by the antenna, which as previously stated consists of distinct signal components including the first and second detection signals, is provided to a spatial region proximate to the antenna. The combined rf signal is specifically chosen such that the signal will at least partially reflect off objects encountered by the combined rf signal after transmission by the antenna. In a preferred form of the present invention, the antenna is an etched phased array antenna such as Part No. DE2006 manufactured by GEC Plessy Semiconductors of the United Kingdom. Alternatively, Part No. DE2001 manufactured by GEC Plessy Semiconductors may be utilized wherein the signal transmitter and receiver, and Gunn or dielectric resonant oscillator circuits are integral with the etched phased array antenna.

The collision avoidance apparatus 2 also preferably includes a signal receiver 12 having at least an input port and an output port wherein the input port is operatively coupled to the antenna 10. In a preferred embodiment and as shown in FIG. 1, the antenna is operatively coupled to both the signal transmitter output port and the signal receiver input port so that the antenna both transmits and receives the first and second detection signals. Alternatively, separate individual antennas may be utilized for transmission and reception. Specifically, a first antenna may be operatively coupled to the signal transmitter for transmitting the combined rf signal and a second antenna may be operatively coupled to the signal receiver for receiving the reflected combined rf signal. After the antenna transmits the combined rf signal to the spatial region, the combined rf signal preferably at least partially reflects off objects located in the spatial region. As a result, at least a portion of the combined rf signal is reflected toward the signal receiver such that the signal receiver is responsive to the at least partially reflected combined rf signal. The antenna is designed to receive the at least partially reflected combined rf signal (which includes reflected first and second detection signals) and to provide the received reflected signal to the signal receiver. The signal receiver 12 may also include an amplifier (not shown) for increasing the strength of the first and second detection signals. Alternatively, a separate amplifier may be coupled to the output port of the signal receiver.

In a preferred embodiment of the present invention, after the at least partially reflected combined rf signal (first and second detection signals) is received by the signal receiver 12, the signal receiver generates first and second object parameter signals. The first and second object parameter signals are preferably provided on the signal receiver output port to a switching device 14 which preferably segregates the first and second object parameter signals. A suitable switching device for separating the first and second object parameter signals is a JFET analog switch manufactured by National Semiconductor Corporation as Part No. LF13331. The switching device 14 also preferably includes an input port for receiving first and second object parameter signals from the signal receiver, and at least first and second output ports for providing the first object parameter signal at the first output port and the second object parameter signal at the second output port.

The first and second output ports of the switching device 14 are preferably electrically coupled to a low pass filter 16 for removal of unwanted noise and distortion components of the first and second object parameter signals. In a preferred embodiment of the invention wherein the operating frequency of first and second object parameter signals is approximately 24 GHz, the low pass filter is preferably a 24 KHz filter. The filtered first and second object parameter signals generated by the low pass filter are thereafter preferably provided to an analog to digital (A/D) converter 18 which preferably has first and second input ports and first and second output ports. The A/D converter converts each of the filtered first and second object parameter signals from analog to digital signals. A suitable, commercially available A/D converter is Part No. CS5339 manufactured by Crystal Semiconductor Corporation.

The A/D converter 18 provides a digital representation of the filtered first and second object parameter signals at the A/D converter first and second output ports. In an alternative embodiment of the invention, the collision avoidance apparatus 2 may also include a second low pass filter (not shown) for enhancement of the digital signal provided by the A/D converter. In this alternative form of the present invention, the second low pass filter is coupled to each output of the A/D converter 18 and is preferably a 7.3 kHz low pass filter which also removes signal noise, signal distortion and other unwanted signal components. Other suitable filters may be employed as required.

The target prediction and collision warning system of the present invention may further include a Fourier transform circuit 20 operatively coupled to the first and second output ports of the A/D converter 18. Preferably, the Fourier transform circuit 20 receives the digital first and second object parameter signals (shown in FIG. 2 as $F_1$ and $F_2$) from the A/D converter at first and second Fourier transform circuit input ports, respectively. The Fourier transform circuit converts the digital first and second object parameter signals from a discrete time domain signal to a discrete frequency domain signal. The Fourier transform circuit 20 further includes first and second output ports so as to provide first and second Fourier transform object parameter signals, each representing a spectral waveshape of the digital first and second object parameter signals. A suitable commercially available Fourier transform circuit is Part No. PDSP16510 manufactured by GEC Plessy Semiconductors of the United Kingdom.

Figure 2:
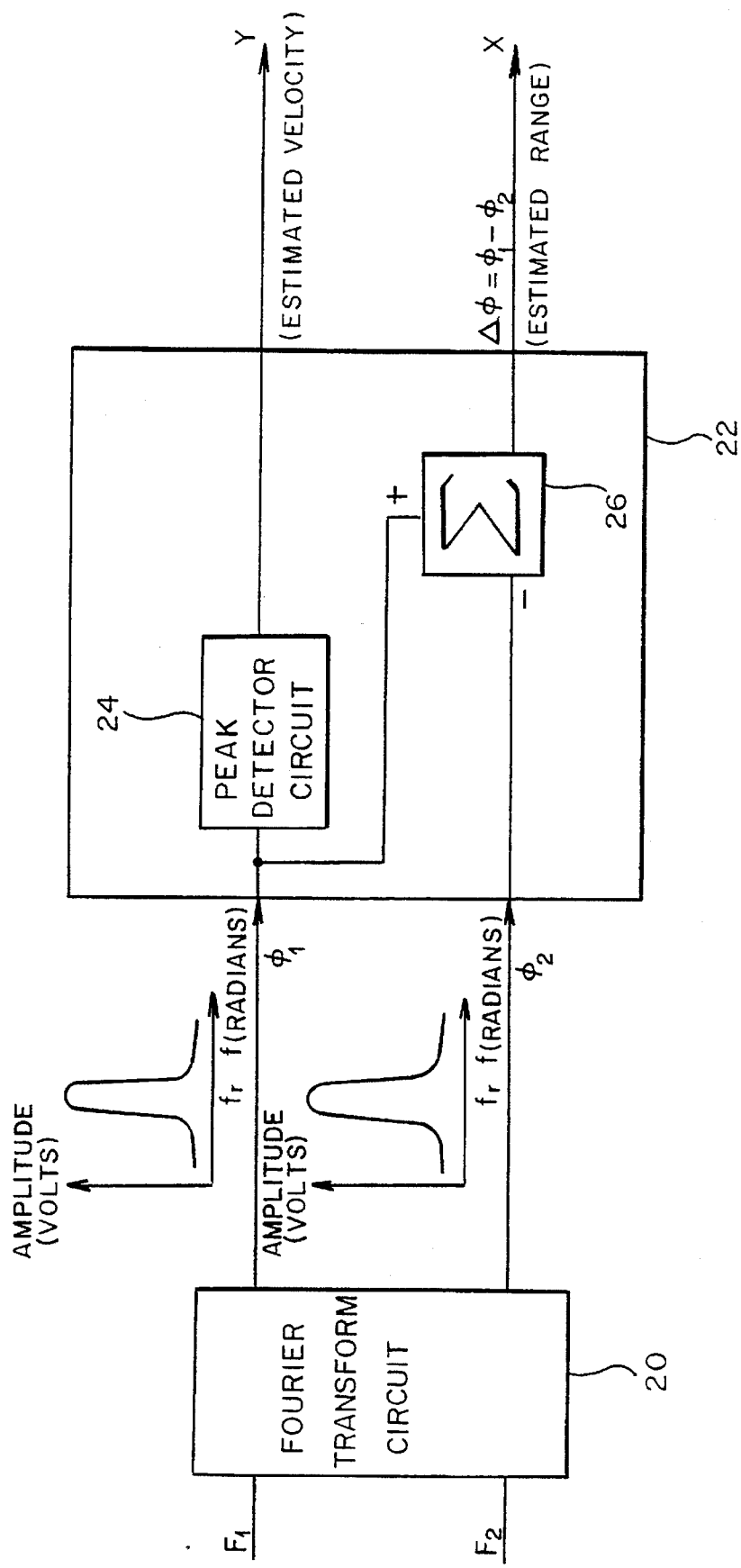
FIG. 2 is a block diagram of one form of a velocity and range detector circuit of FIG. 1 coupled to a Fourier transform circuit.

As shown in FIG. 2, the first and second Fourier transform object parameter signals provide a spectrum of the intensity of the at least partially reflected first and second detection signals at specific intervals. The output of the Fourier transform circuit is provided to a velocity and range detector circuit 22 shown in FIG. 1 and more specifically shown in FIG. 2. Preferably, the velocity and range detector circuit includes a peak detector circuit 24 having its input port operatively coupled to the Fourier transform circuit first output port for receiving the first Fourier transform object parameter signal. The velocity and range detector circuit 22 also includes a combiner circuit 26, having at least first and second input ports. Preferably, the first input port of the combiner circuit is operatively coupled to the peak detector circuit output port, and the second input port of the combiner circuit is operatively coupled to the second output port of the Fourier transform circuit. A commercially available suitable peak detector circuit is Part No. 74F524 manufactured by Signetics, a subsidiary of the Philips Corporation, and a suitable combiner is Part No. 74F283 also manufactured by Signetics.

Based upon the Fourier transform first object parameter signal received by the peak detector circuit 24, the peak detector circuit provides an output signal indicative of the velocity of the target being monitored. In contrast, the combiner circuit 26 receives both the Fourier transform first and second object parameter signal and provides a combiner circuit output signal indicative of the difference between the first and second object parameter signals which corresponds to the range (distance) of the target from the vehicle.

The output ports of the velocity and range detector circuit 22 (respectively corresponding to the output ports of the peak detector circuit 24 and the combiner circuit 26) are preferably operatively coupled to an adaptive probabilistic neural network (APNN) processor 28. The adaptive probabilistic neural network processor is preferably configured and operates as described with respect to FIGS. 1–5 in U.S. patent application Ser. No. 08/177,359 filed Jan. 3, 1994 and U.S. Pat. No. 5,276,772 which issued on Jan. 4, 1994. Specifically, the adaptive probabilistic neural network processor receives the velocity and range finder output signals as input signals and, based upon previous velocity and range detector output signals, classifies (i.e., sorts) a current velocity and range detector output signal utilizing a probability density function.

Coupled to the probabilistic neural network 28 is a target tracker circuit 30. The target tracker circuit receives a signal from the APNN indicative of range and velocity data of the targets being monitored and fits the measure range and velocity data of each target to a second or higher order polynomial in order to achieve improved target tracking, target prediction and data compression. Specifically, the target tracker determines coefficients of a second or higher order regression which effectively describes the relationship of relative velocity and range for each target being monitored. In the preferred form of the invention, a data recorder 31 is coupled to the output of the target tracker circuit 30 for storing raw range and velocity data and regression coefficients generated by the target tracker circuit.

The target tracker circuit 30 of the present invention utilizes recursive signal processing to minimize the sum-of-squared error at the output of the target tracker circuit 30 based on the measured data to determine regression coefficients that fit a second or higher order polynomial. Based upon the regression coefficients and by means of data extrapolation, the target tracker circuit can estimate "missing" range and velocity data due to target maneuvering in-and-out of the radar's field of view or simply due to a low signal-to-noise (S/N) ratio. Additionally, since the target's path can be characterized by regression coefficients based upon the measured range and velocity data of the target, the current system need only store the regression coefficients rather than all of the measured range and velocity data. This provides extraordinary savings of required memory in order to accomplish off-line accident reconstruction.

Figure 3:
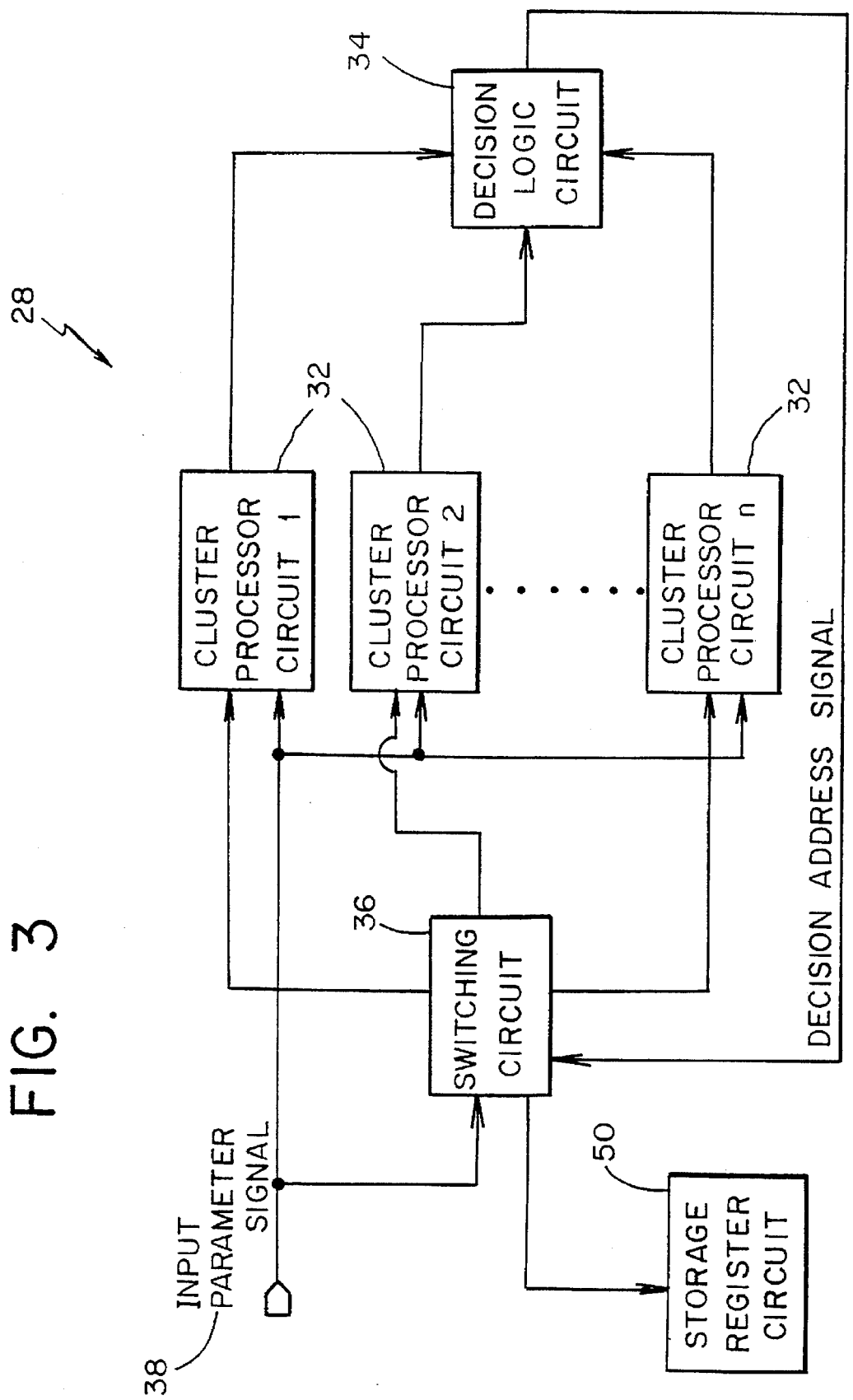
FIG. 3 is a block diagram of one form of an adaptive probabilistic neural network system utilized in the present invention.

Referring now to FIG. 3 of the drawings, a preferred real time data sorting adaptive probabilistic neural network (APNN) 28 suitable for use in the present invention will now be described. The APNN includes a plurality of identical subunits commonly referred to as cluster processor circuits 32. Each cluster processor circuit may be classified as a currently operating cluster processor circuit, a newly operating cluster processor circuit or a non-operating cluster processor circuit. Each of the plurality cluster processor circuits 32 are operatively coupled to a decision logic circuit 34 and to a switching circuit 36. As shown in FIG. 3, the decision logic circuit is also coupled to the switching circuit. Currently operating cluster processor circuits generate and provide a probability density function estimation value signal to the decision logic circuit based on the range and velocity data received. The decision logic circuit generates and provides a decision address signal to the switching circuit which directs a current unassigned input parameter signal 38 (corresponding to new relative range and velocity data) to the cluster processor circuit that contains relative range and velocity data that most closely matches the current unassigned input parameter signal.

Figure 4:
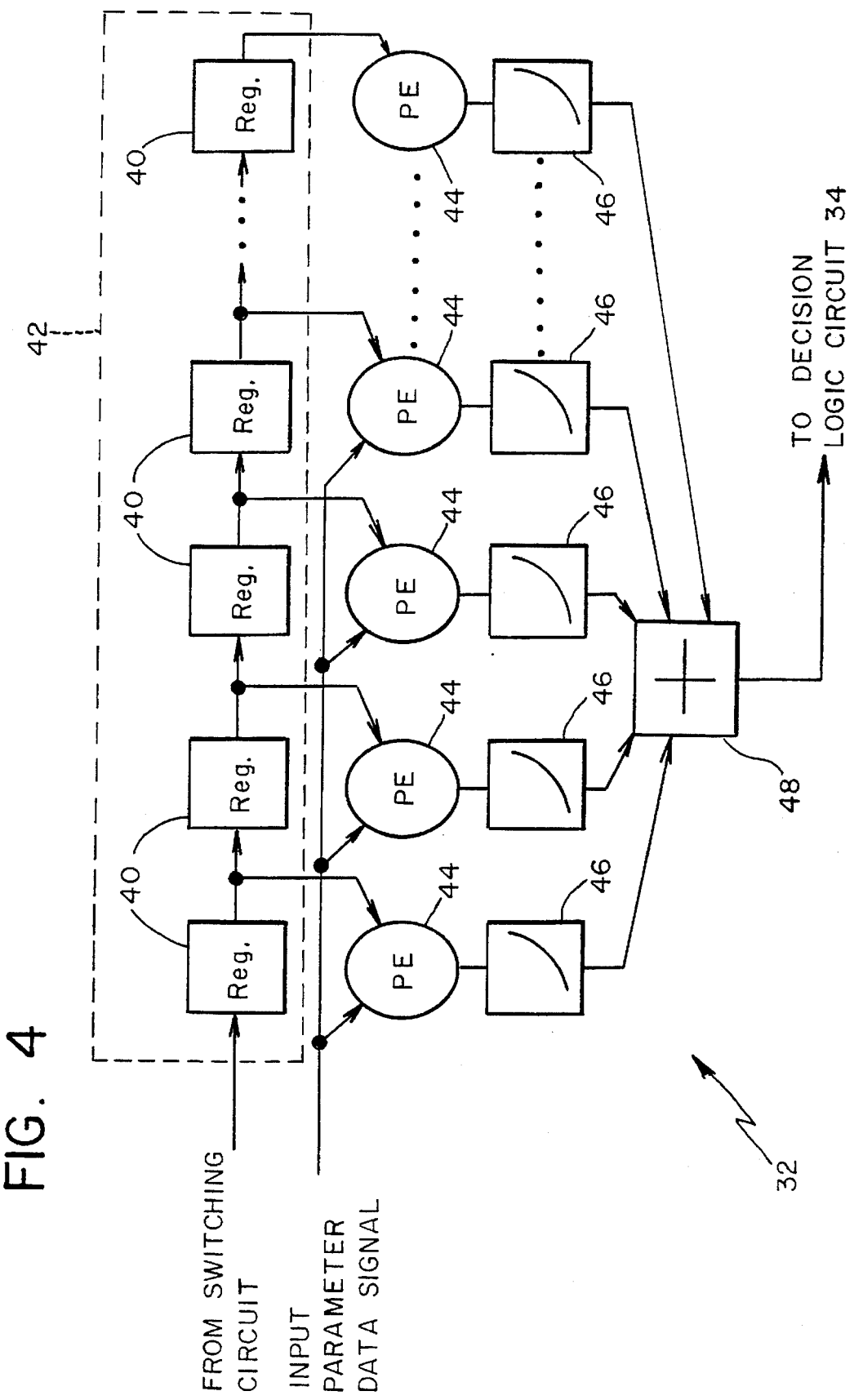
FIG. 4 is a block diagram of one form of a cluster processor used in the adaptive probabilistic neural network shown in FIG. 3.

A preferred form of the cluster processor circuit 32 is illustrated in FIG. 4 of the drawings. The cluster processor circuit includes a plurality of serially connected registers 40 (i.e., buffer memory circuits). The serially connected registers serve to store the input parameter signal 38 assigned to the respective cluster processor circuit by the switching circuit 36. The combination of serially connected registers within the cluster processor circuit define a pulse buffer memory circuit 42.

Each cluster processor circuit 32 also includes a plurality of processing elements 44 that are coupled to a respective register 40 of the pulse buffer memory circuit 42 and to the APNN. As a result of this configuration, each processing element receives the current unassigned input parameter signal 38 and assigned input parameter signals stored in respective registers of the pulse buffer memory circuit. Each processing element is designed to generate and transmit a signal to a respective exponential function circuit 46 which is operatively coupled to a respective processing element. Each exponential function circuit receives the output signal of a respective processing element, performs an exponential function thereon, and provides an exponential function circuit output signal.

The cluster processor circuit 32 also includes a summation circuit 48 operatively coupled to each of the plurality of exponential function circuits 46 for receiving each exponential function circuit output signal. In response, the summation circuit generates an output signal corresponding to the output signal of the respective cluster processor circuit. The summation circuit output signal corresponds to a probability density function estimation value of the particular target and its associated range and velocity data stored in the cluster processor. A probability density function estimation value is simultaneously calculated for each currently operating cluster processor circuit of the APNN. The probability density function estimation value signal provides an indication of the probability that the current unassigned input parameter signal matches or belongs to the group of assigned input parameter signals currently stored in the registers 40 of the pulse buffer memory circuit 42 of the respective cluster processor circuit.

The cluster processor circuits 32 of the APNN may employ parallel processing using transputers. A suitable transputer which may be used is Part No. MTM-PC, which is a reconfigurable multi-transputer, manufactured by Inmos Corporation.

The decision logic circuit 34 of the APNN, which includes a plurality of comparators, is operatively coupled to the summation circuit 48 of each cluster processor circuit 32. The decision logic circuit is designed to compare the probability density function estimation value signal of each currently operating cluster processor circuit to at least a first threshold value signal. The comparison process occurs simultaneously for all currently operating cluster processor circuits (i.e., in parallel). As a result of the comparison, a decision address signal is generated and transmitted by the decision logic circuit to the switching circuit 36 which is operatively coupled to the decision logic circuit 34.

The decision address signal corresponds to the cluster processor circuit currently storing the assigned input parameter signals which most closely matches the current unassigned input parameter signal. The decision address signal can designate any currently operating cluster processor circuit or it can activate a non-operating cluster processor circuit if a currently operating cluster processor circuit does not provide a close match. When none of the currently operating cluster processor circuits provide a close match, one of the non-operating cluster processor circuits is activated so that the pulse buffer memory circuit 42 of the newly operating cluster processor circuit will store the current input parameter signal. The switching circuit 36 is also operatively coupled to the pulse buffer memory circuit 42 of each cluster processor circuit. In operation, the switching circuit 36 receives the current unassigned input parameter signal 38 and, upon receiving the decision address signal from the decision logic circuit 34, transmits the current unassigned input parameter signal to the pulse buffer memory circuit 42 identified by the decision address signal received.

A preferred form of the APNN includes a storage register circuit 50 operatively coupled to the switching circuit 36 for receiving the current unassigned input parameter signal. The switching circuit effectively transfers the input parameter signals which can not be properly sorted by the present sorting method employed by the APNN to the storage register circuit. The assignment of the current unassigned input parameter signal to the storage register circuit corresponds to a probability density function estimation value signal of the respective cluster processor circuit which is less than the first threshold value signal and greater than the second threshold value signal. The input parameter signal is maintained in the storage register circuit for possible future analysis, processing and sorting.

The operation of the real time adaptive probabilistic neural network (APNN) for use in the target prediction and collision warning system will now be described. Initially, the registers 40 of the pulse buffer memory circuit 42 of each cluster processor circuit 32 are empty and contain no input parameter signals. The APNN system is designed so that a priori training data does not have to be provided to the registers at the beginning of system operation in order to effectuate sorting. The APNN system operates to develop its own sorting groups as the current unassigned input parameter signals 38 are introduced to the system. The sorting groups are defined by an internal competition among the cluster processor circuits. Each currently operating cluster processor circuit represents a different sorting group corresponding to a different type of input parameter signal received. If the calculated probability density function estimation value signal of each currently operating cluster processor is less than at least a first threshold value signal, then a match does not exist between the current unassigned input parameter signal and the assigned input parameter signal stored in each currently operating cluster processor circuit. Therefore, a previously non-operating cluster processor circuit will be activated to establish a newly operating cluster processor circuit for storing the current input parameter signal.

The input parameter signal 38 introduced to the APNN system can represent any collection of measured data. In the preferred embodiment, the input parameter signal is represented by a series of signal parameters (x) where $$x = [\text{relative target range, relative target velocity}]$$

Initially, when the system is activated, only a first cluster processor circuit of the plurality of cluster processor circuits is "currently operating". All other cluster processor circuits within the APNN system are "non-operating". The APNN system is initialized by receiving and providing the first input parameter signal into the currently operating first cluster processor circuit. As the first input parameter signal is introduced to the APNN system, it is provided to each processing element 44 of the currently operating first cluster processor circuit. A probability density function estimation value signal is then generated in the currently operating first cluster processor circuit by the combined effects of the processing elements, the exponential function circuits, and the summation circuit. The probability density function estimation value signal corresponding to the first input parameter signal is thereafter provided by the summation circuit of the currently operating first cluster processor circuit.

The probability density function estimation value signal is generated according to the formula:

$$Pr(X_i) = \frac{1}{M} \sum_{j=1}^{M} \text{EXP}\left[ -\frac{(X_j - W_{ij})^2}{\text{SIGMA}^2} \right]$$

where

Pr=probability density function estimation value

X=the current input parameter signal

W=previous input parameter signal which is currently stored in a register of the pulse buffer i=cluster processor number corresponding to the emitter group or bin number j=current input parameter signal being analyzed SIGMA=smoothing factor which represents the standard deviation of the probability density function (a constant set by the system operator)

M=total number of parameters contained in the input data signal (i.e., range, velocity)

EXP=the exponential function

The probability density function estimation value signal is generated by the currently operating first cluster processor circuit in the following manner. The current unassigned input parameter signal to be sorted is received and provided to each processing element 44 of the first cluster processor circuit. Each processing element determines a value for the expression:

$$\left[ -\frac{(X_j - W_{ij})^2}{\text{SIGMA}^2} \right]$$

The above expression correlates to subtracting each parameter of the assigned input parameter signals stored in the registers 40 of the pulse buffer memory circuit 42 from the current unassigned input parameter signal. Since the current unassigned input parameter signal is the first data signal provided to the APNN system, there are no signals stored in the serially connected registers of the pulse buffer memory circuit. To account for the lack of stored data in the pulse buffer memory circuit, logic zeros are transmitted from each serially connected register to each processing element so that a value for the above expression can be generated. The difference between the input parameter signals stored in the registers (here it is logic zero) and the current unassigned input parameter signal is then squared and divided by Sigma$^2$, where Sigma has a constant value. The resulting value is provided to the exponential function circuit 46 which performs an exponential function and generates a signal which is provided to the summation circuit 48.

The summation circuit 48 combines the output signals of each exponential function circuit 46. The output signal of the summation circuit, which corresponds to the output signal of the respective cluster processor circuit, is a measure of the probability or likelihood that the current unassigned input parameter signal matches the assigned input parameter signal stored in the pulse buffer memory circuit of the respective cluster processor circuit. For example, a probability density function estimation value signal of 80% indicates a high probability of correctly matching the current unassigned input parameter signal. However, a probability density function estimation value signal of 10% represents a decisive mismatch for the current unassigned input parameter signal and the corresponding cluster processor circuit.

The decision logic circuit 34 contains at least a first threshold value signal. The decision logic circuit receives and compares the probability density function estimation value signal of the currently operating first cluster processor circuit to at least the first threshold value signal. The decision logic circuit comparison determines whether the current unassigned input parameter signal should be stored in the currently operating first cluster processor circuit or whether a non-operating cluster processor circuit should be activated to store the current unassigned input parameter signal. A newly operating cluster processor circuit represents a new sorting classification of input parameter signals received. In the preferred embodiment, two threshold value signals are utilized. They are the 70% and 10% threshold value signals. If it is assumed that the probability density function estimation value signal for the currently operating first cluster processor circuit is at least equal to the 70% threshold value signal, then the current unassigned input parameter signal will be stored in the currently operating first cluster processor circuit. Therefore, after comparing the probability density function estimation value signal of the currently operating first cluster processor circuit with the 70% and 10% threshold value signals, the decision logic circuit will generate and provide a decision address signal to the switching circuit 36 corresponding to the currently operating first cluster processor circuit. The decision address signal directs the switching circuit to transmit the current unassigned input parameter signal to the first register of the pulse buffer memory circuit 42 for temporary storage.

If the probability density function estimation value of the currently operating first cluster processor circuit is at most equal to the 10% threshold value signal, then a decision address signal will be transmitted instructing the switching circuit 36 to activate a previously non-operating cluster processor circuit. The previously non-operating cluster processor circuit is now referred to as a newly operating cluster processor circuit. The switching circuit then transmits the current unassigned input parameter signal to the first register of the pulse buffer memory circuit of the newly operating cluster processor circuit for temporary storage therein. The activation of the newly operating cluster processor circuit corresponds to a new type of input parameter signal received by the APNN system.

If the probability density function estimation value signal generated by the currently operating first cluster processor circuit is greater than the 10% and less than the 70% threshold value signals, then a different decision address signal is transmitted by the decision logic circuit 34 to the switching circuit 36. This decision address signal instructs the switching circuit to assign the current unassigned input parameter signal to the storage register circuit 50. The input parameter signal stored in the storage register circuit is saved so that the APNN system can analyze the stored input parameter signal in greater detail at a later time. The input parameter signal stored in the storage register circuit is not used in subsequent calculations of probability density function estimation value signals. If desired, the unassigned input parameter signal stored in the storage register circuit can undergo a second level of analysis called deinterleaving. After the data has been deinterleaved, it can be sorted and stored in any currently operating or newly operating cluster processor circuit.

The real time adaptive probabilistic neural network is advantageous because it can sort signals at rates of over 10 million/sec. This is possible because the APNN system generates output signals using parallel processing which enables a real time response.

Referring again to FIG. 1 and to FIGS. 5, 6 and 7, the target tracker circuit 30 of the present invention will now be described. As previously mentioned, the target tracker circuit 30 is coupled to the APNN 28 so as to receive signals from the APNN representative of data relating to the relative range and velocity of a respective target. However, the target tracker circuit could also be directly coupled to the velocity and range detector circuit 22, the Fourier transform circuit 20, the signal receiver 12 or any component therebetween. The target tracker circuit preferably includes a plurality of direct least squares determination circuits 52 and a plurality of Kalman filter circuits 54 (i.e., recursive least squares determination circuits) wherein one of the plurality of direct least squares circuits and one of the plurality of Kalman filter circuits is coupled to each cluster processor circuit of the APNN. For simplicity, only one target tracker circuit is shown in the figures.

Figure 5:
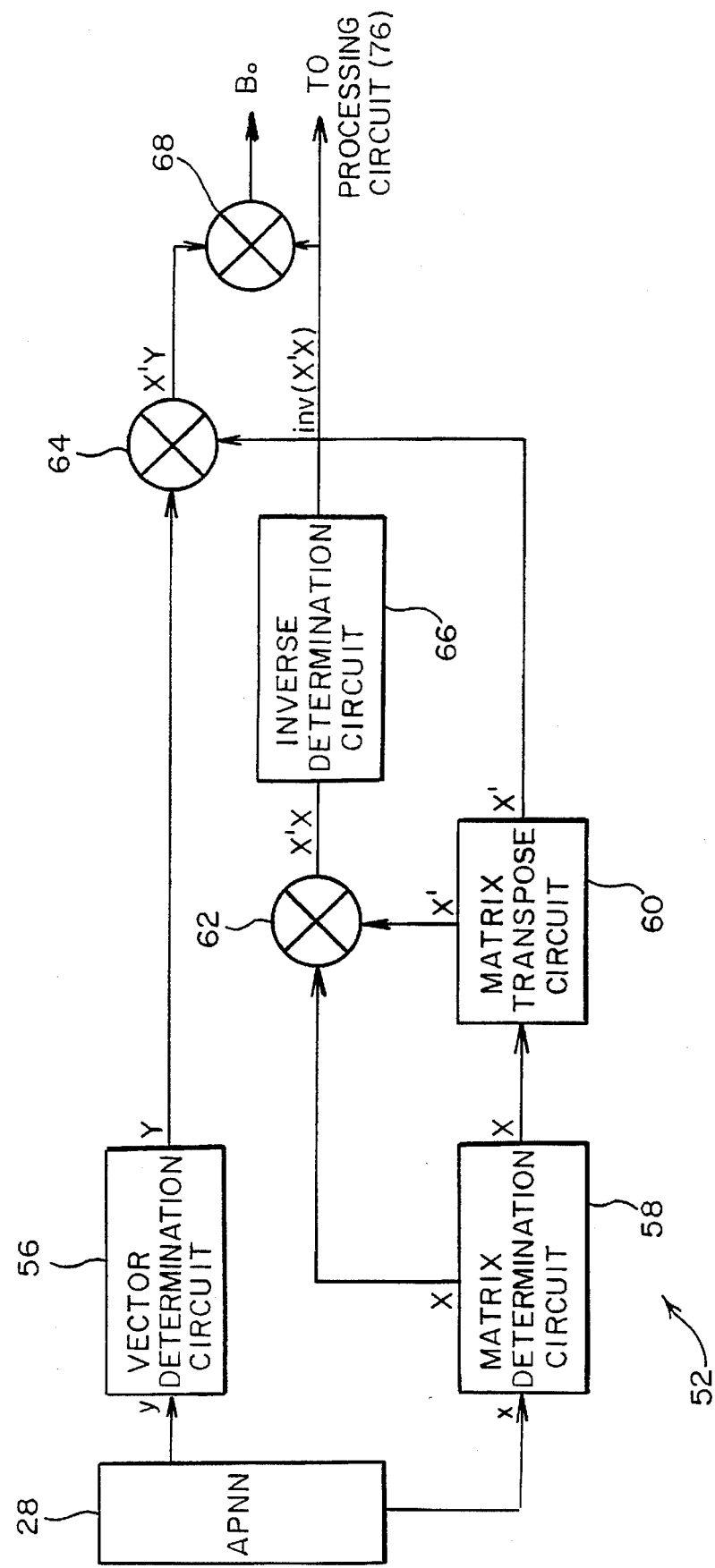
FIG. 5 is a block diagram of one form of a direct least squares determination circuit constructed in accordance with the present invention coupled to the adaptive probabilistic neural network.

Referring now to FIG. 5, a preferred form of the direct least squares circuit 52 of the target tracker circuit 30 will now be described. The direct least squares circuit receives signals from the APNN 28 indicative of at least the first three data samples of a target being tracked, and generates an output signal indicative of parameters (regression coefficients a,b,c) which solve the following linear regression equation:

$$y = a + bx + cx^2 + v$$

where "y" is the relative velocity of the target, "x" is the relative range of the target, and "v" is the system measurement error.

The linear regression equation can be represented in matrix form by the following:

$$Y = XB + V$$

where

X is the 3 by N range matrix,

Y is the N by 1 velocity vector,

V is the N by 1 error vector,

B is a set of unknown coefficients (a,b,c), and

N is the number of data samples.

The terms X,Y,V and B may be expressed by the following matrices:

$$X = \begin{bmatrix} 1 & x_{(1)} & x_{(1)}^2 \\ 1 & x_{(2)} & x_{(2)}^2 \\ & \cdot & \\ & \cdot & \\ & \cdot & \\ 1 & x_{(N)} & x_{(N)}^2 \end{bmatrix} \quad Y = \begin{bmatrix} y_{(1)} \\ y_{(2)} \\ \cdot \\ \cdot \\ \cdot \\ y_{(N)} \end{bmatrix} \quad V = \begin{bmatrix} v_{(1)} \\ v_{(2)} \\ \cdot \\ \cdot \\ \cdot \\ v_{(N)} \end{bmatrix} \quad B = \begin{bmatrix} a \\ b \\ c \end{bmatrix}$$

In view of the above described matrix expression, the system and method of the present invention is designed to find B, the set of unknown coefficients (a,b,c) such that the sum of squared errors is minimized. This can be accomplished utilizing the following expression:

$$J = V'V = (Y - XB)'(Y - XB)$$

where V' is the matrix transpose of V. The direct least squares solution can be found by setting the derivative of J with respect to each component of B to zero; that is, Set $\partial J/\partial B = 0$ and solve for B.

This leads to an optimal estimate of the regression coefficients, a, b and c which are given by the matrix product, $$B = \text{inv}(X'X) \, X'Y$$

where

X is a relative range matrix,

X' is the matrix transpose of X,

Y is a relative velocity vector, inv(X'X) is the matrix inverse of the matrix product, X'X, and B is the matrix transpose of regression coefficients.

In order to implement the above-described signal and matrix manipulation, and to determine the regression parameters identified above, the direct least squares circuit 52 includes a vector determination circuit 56 and a matrix determination circuit 58. The vector determination circuit is preferably coupled to the APNN for receiving a signal from the APNN indicative of at least three relative velocity data samples (y) of a target being tracked. In response, the vector determination circuit generates an output signal corresponding to a vector Y (N×1 matrix) composed of the three relative velocity data samples as follows:

$$Y = \begin{bmatrix} y_1 \\ y_2 \\ y_3 \end{bmatrix}$$

Also operatively coupled to the APNN is the matrix determination circuit 58 for receiving a signal from the APNN indicative of at least three relative range data samples (X) of a target being tracked from the APNN. The matrix determination circuit processes the received signal and generates a signal indicative of a 3×N matrix (X) wherein the first column of the matrix comprises all "1", the second column of the matrix corresponds to the individual measured range sample data ($x_1, x_2 \ldots x_n$ of the target) and the last column corresponds to the square of each individual range sample data as follows for N=3:

$$X = \begin{bmatrix} 1 & x_1 & x_1^2 \\ 1 & x_2 & x_2 2 \\ 1 & x_3 & x_3^2 \end{bmatrix}$$

The direct least squares determination circuit also includes a matrix transpose circuit 60 operatively coupled to an output port of the matrix determination circuit 58. The matrix transpose circuit receives the matrix determination circuit output signal and generates a signal corresponding to a matrix transpose function (X') of the 3×3 range matrix X as follows:

$$X' = \begin{bmatrix} 1 & 1 & 1 \\ x_1 & x_2 & x_3 \\ x_1^2 & x_2^2 & x_3^2 \end{bmatrix}$$

Operatively coupled to the output of the matrix transpose circuit is a first mixer circuit 62 for receiving the matrix transpose circuit output signal (X'). The first mixer circuit is also operatively coupled to an output port of the matrix determination circuit for receiving the matrix determination circuit output signal (X). The first mixer circuit effectively combines the matrix determination circuit output signal and the transpose matrix circuit output signal to provide a first mixer output signal. The first mixer output signal (X'X) is indicative of the matrix product of the 3×3 range matrix (X) generated by the matrix determination circuit and the 3×3 matrix (X') generated by the transpose matrix circuit such that:

$$X^tX = \begin{bmatrix} 3 & x_1+x_2+x_3 & x_1^2+x_2^2+x_3^2 \\ x_1+x_2+x_3 & x_1^2+x_2^2+x_3^2 & x_1^3+x_2^3+x_3^3 \\ x_1^2+x_2^2+x_3^2 & x_1^3+x_2^3+x_3^3 & x_1^4+x_2^4+x_3^4 \end{bmatrix}$$

The matrix transpose circuit 60 is also operatively coupled to a second mixer circuit 64. The second mixer circuit is coupled to an output port of the vector determination circuit 56. The vector determination circuit output signal (Y) is provided to the second mixer circuit along with the transpose matrix circuit output signal (X') as respective first and second input signals. The second mixer circuit combines the first and second input signals and provides a second mixer circuit output signal indicative of a matrix product of the relative velocity vector (Y) provided by the vector determination circuit and the transpose of the relative range matrix (X') provided by the matrix transpose circuit. Specifically, the second mixer output signal (X'Y) is representative of a 3×1 vector as follows:

$$X^tY = \begin{bmatrix} y_1+y_2+y_3 \\ x_1y_1+x_2y_2+x_3y_3 \\ x_1^2y_1+x_2^2y_2+x_3^2y_3 \end{bmatrix}$$

In a preferred embodiment of the invention, the direct least squares determination circuit 52 also includes an inverse matrix determination circuit 66 operatively coupled to the first mixer circuit 62. The inverse matrix determination circuit receives the first mixer circuit output signal (X'X) and provides an inverse matrix determination circuit output signal [inv(X'X)] corresponding to a matrix inverse function provided by the first mixer circuit. Operatively coupled to the inverse determination circuit is a third mixer circuit 68 which receives the inverse determination circuit output signal. The third mixer circuit is also coupled to the second mixer circuit 64 for receiving the second mixer circuit output signal (X'Y). In response to the two signals provided thereto, an initial regression coefficient signal $B_0$ (which corresponds to the direct least squares circuit output signal) is provided by the third mixer circuit 68. The direct least squares circuit output signal is indicative of an initial regression coefficient vector B which corresponds to coefficients a, b and c. The regression coefficient signal generated by the direct least squares determination circuit corresponds to a second or higher order relationship of the relative range and velocity of a target being tracked.

Figure 6:
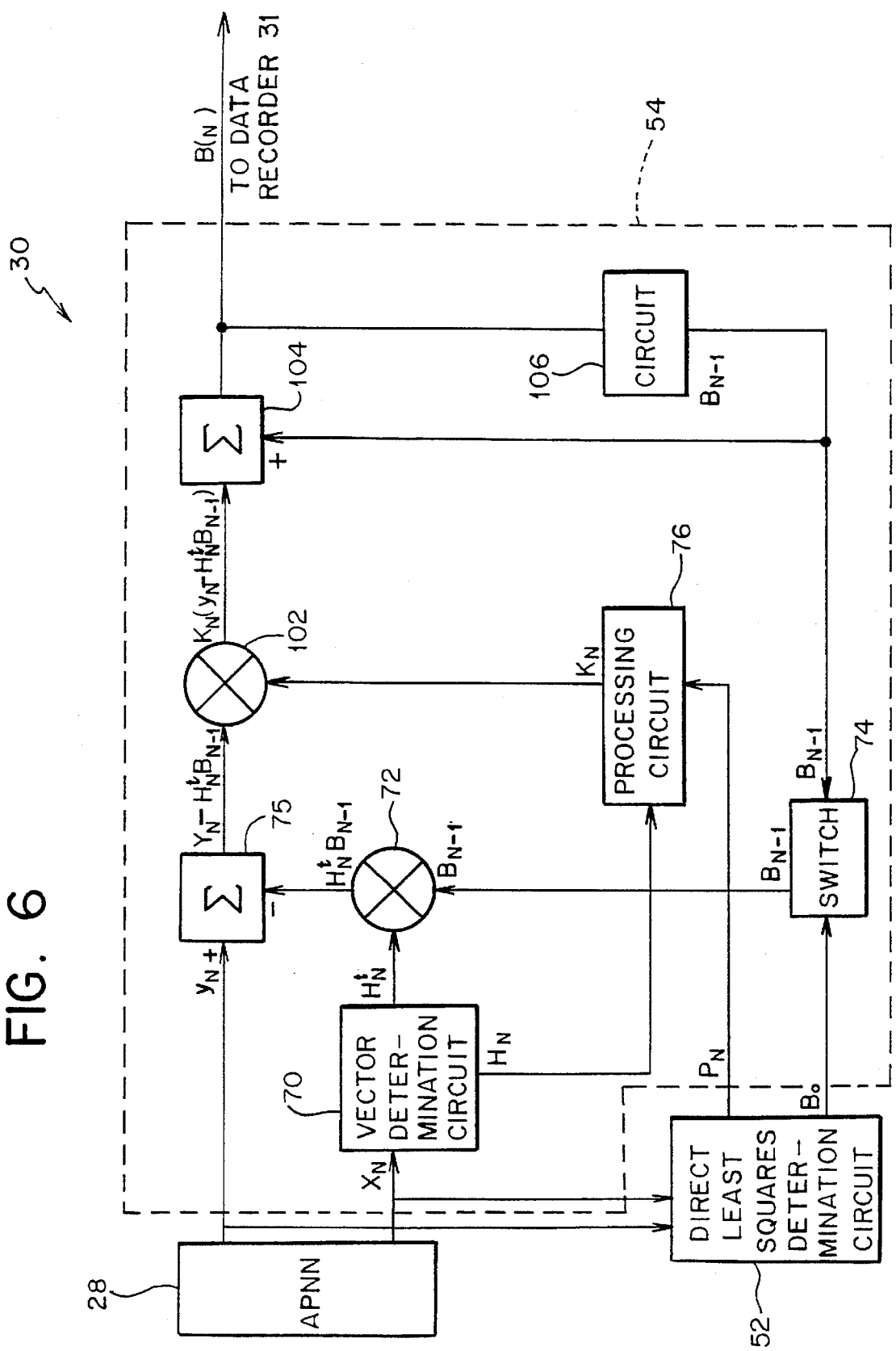
FIG. 6 is a block diagram of one form of a Kalman filter circuit (recursive least squares determination circuit) constructed in accordance with the present invention coupled to the adaptive probabilistic neural network and the direct least squares determination circuit.

Referring now to FIG. 6, the target tracker circuit of the present invention also includes a Kalman filter circuit 54 coupled to both the APNN 28 and the direct least squares determination circuit 52. In a preferred embodiment of the invention, the Kalman filter circuit initially receives signals from the APNN indicative of at least four relative velocity and range data samples of the target being monitored. The Kalman filter circuit also initially receives the direct least squares determination circuit output signal (corresponding to the initial regression coefficient signal $B_0$) as an input signal. In response, the Kalman filter circuit updates the initial regression coefficient signal ($B_0$) based upon the fourth relative range and velocity data samples to provide a current regression coefficient signal $B_n$. Specifically, the Kalman filter circuit iteratively updates the regression coefficient signal after each successive relative range and velocity data sample is measured and provided thereto. The method of calculating the updated regression coefficients (a,b,c) $B_n$ is defined by the following expression:

$$B_n = B_{n-1} + K_n[Y_n - H_n^t B_n]$$

where $B_{n-1}$ is the preceding regression coefficient signal;

$K_n$ is the current filter gain signal;

$Y_n$ is the current relative velocity sample data matrix signal;

$H_n$ is the current relative range sample data vector signal;

$H_n^t$ is the matrix transpose of H;

and where $$K_n = P_{n-1} H_n C_n;$$

$$C_n = [H_n^t P_n H_n + 1]^{-1};$$

$$P_n = [1 - K_n H_{n-1}^t] P_{n-1};$$

and where $c_n$ is a scaler quantity; and $P_n$ is a covariance matrix signal.

Referring to FIG. 6, a preferred form of the Kalman filter circuit 54 utilized in accordance with the present invention will now be described. Each Kalman filter circuit includes a recursive vector determination circuit 70 having an input port coupled to the APNN 28 for receiving a signal from the APNN which corresponds to at least four relative range data samples (x) of the target being monitored. The recursive vector determination circuit also has at least two output ports. In response to the signal received from the APNN, the recursive vector determination circuit generates a first output signal ($H_N$) indicative of a vector composed of the at least four relative range data samples of the target being tracked such that:

$$H_N = \begin{bmatrix} 1 \\ x_1 \\ x_2 \\ \cdot \\ \cdot \\ \cdot \\ x_N \end{bmatrix}$$

The recursive vector determination circuit also generates a second output signal ($H_N^t$) indicative of a transpose function of the first output signal as follows:

$$H_N^t = [1 \; x_1 \; x_2 \ldots x_N]$$

Coupled to the output port of the recursive vector determination circuit 70 is a first recursive mixer circuit 72 having at least two input ports and one output port. The first recursive mixer circuit receives the second output signal ($H_N^t$) of the recursive vector determination circuit at one input port. The second input port of the first recursive mixer circuit is coupled, through switch 74, to both the output port of the Kalman filter circuit 54 and the output port of the direct least squares circuit 52. As a result of the coupling through switch 74, the first recursive mixer circuit 72 receives the immediately preceding set of calculated regression coefficients ($B_{N-1}$) which may be either the initial regression coefficient signal ($B_0$) generated by the direct least squares determination circuit or the Kalman filter circuit output signal ($B_N$). The first recursive mixer circuit 72 provides an output signal ($H_N^t B_{N-1}$) corresponding to the matrix product of second output signal of the first recursive mixer circuit $H_N^t$ and the regression coefficient signal ($B_{N-1}$). The regression coefficient signal can be represented as follows:

$$B_{N-1} = \begin{bmatrix} a \\ b \\ c \end{bmatrix}$$

and the first recursive matrix output signal can be represented as follows:

$$H_N{}^t B_{N-1} = [a + bx_1 + cx_2]$$

In a preferred form of the present invention, the switch 74 is preferably a single pole-double throw (SPDT) switch which, for the Kalman filter circuit's first iteration, couples the first recursive mixer circuit to the output of the direct least squares determination circuit for receiving the initial regression coefficient B. However, for each successive iteration, the SPDT switch 74 operatively couples the first mixer circuit 72 to the output port of the Kalman filter circuit so that the immediately preceding regression coefficient signal ($B_{N-1}$) is provided for modification based upon the newly measured relative velocity and range data samples.

The Kalman filter circuit 54 also includes a first recursive combiner circuit 75 having at least two input ports and an output port. The first recursive combiner circuit is operatively coupled to the APNN 28 for receiving a signal corresponding to at least four relative velocity data samples (y) of the target being tracked as follows:

$$y_N = \begin{bmatrix} y_1 \\ y_2 \\ \cdot \\ \cdot \\ \cdot \\ y_N \end{bmatrix}$$

The first recursive combiner circuit 75 is also operatively coupled to the first recursive mixer circuit 72 and receives the first recursive mixer circuit output signal ($H_N{}^t B_{N-1}$) at a second input port. In response to the two input signals, the first recursive combiner circuit effectively subtracts the first recursive mixer circuit output signal from the relative velocity data signal and provides a first recursive combiner output signal ($y_N - H_N{}^t B_{N-1}$) at its output port represented as follows:

$$Y_N - H_N{}^t B_{N-1} = \begin{bmatrix} y_1 - a \\ y_2 - bx_1 \\ y_3 - cy_2 \end{bmatrix}$$

Operatively coupled to the second output port of the vector determination circuit 70 is a processing circuit 76. The processing circuit receives the vector determination circuit first output signal ($H_N$) and generates a processing circuit signal ($K_N$) which is a gain (scaling) factor indicative of a difference between the prior position of the target being monitored and its current position. As shown in FIG. 7, the processing circuit 76 preferably includes a recursive scaler determination circuit 78, recursive gain determination circuit 80, recursive covariance matrix determination circuit 82, and a delay circuit 84.

Figure 7:
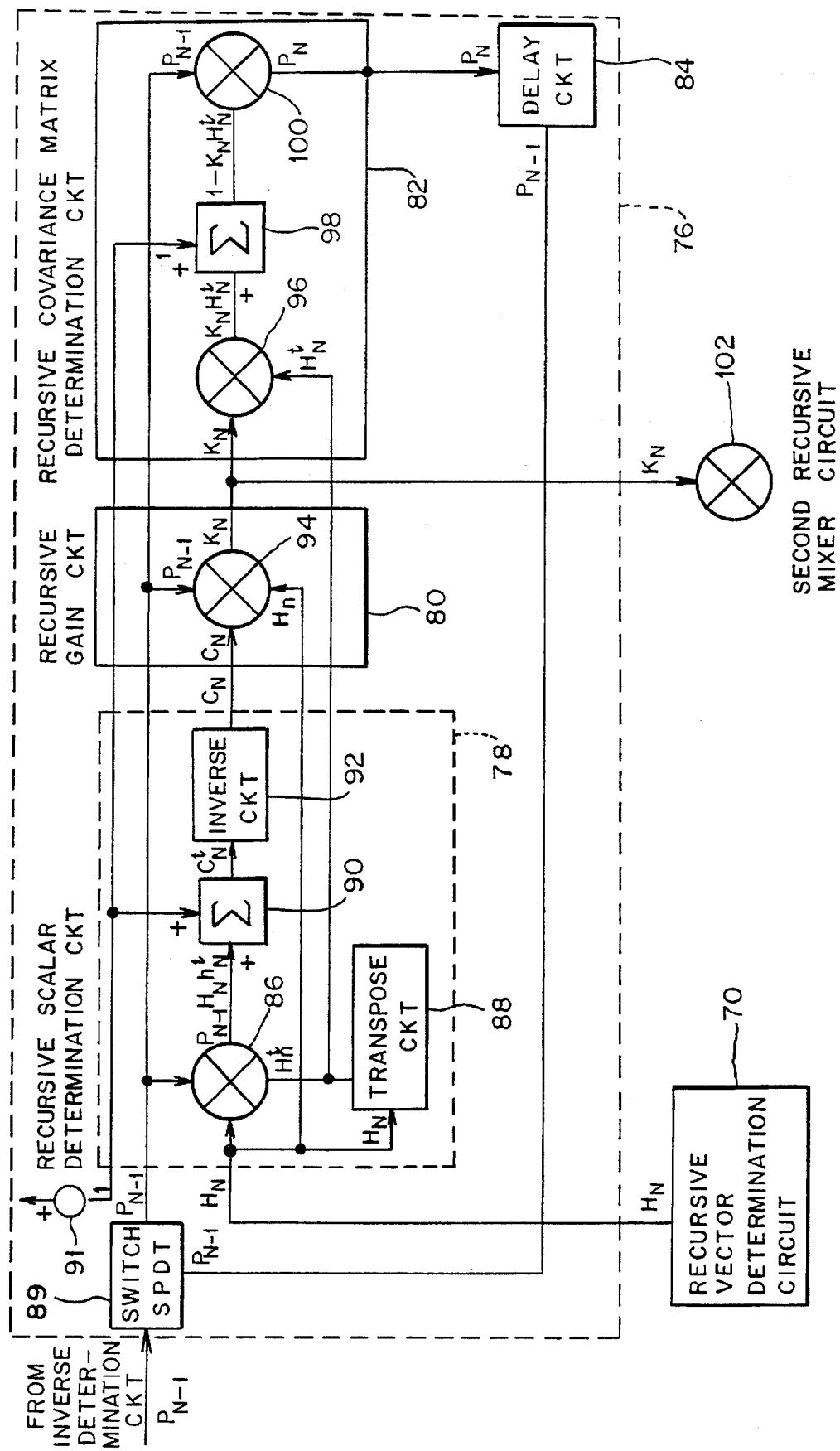
FIG. 7 is a block diagram of one form of a processing circuit constructed in accordance with the present invention for incorporation in the Kalman filter circuit (recursive least squares determination circuit) of the target tracker circuit.

Referring now to FIG. 7, a preferred form of the processing circuit 76 will now be described. The processing circuit preferably includes the recursive scaler determination circuit 78 operatively coupled to the recursive vector determination circuit 70. The recursive scaler determination circuit includes a scaler mixer circuit 86 having three input ports and an output port. The scaler mixer circuit preferably receives the vector determination circuit output signal ($H_N$) at a first input port. Also coupled to the output of the vector determination circuit 70 is a scaler transpose circuit 88 which receives the vector determination circuit output signal $H_N$ and generates a scaler transpose circuit output signal $H_N{}^t$ indicative of a transpose function of the vector determination circuit output signal. Alternatively, the recursive scaler mixer circuit can receive the transpose of the recursive vector determination circuit output signal $H_N{}^t$ directly from the recursive matrix determination circuit.

The scaler mixer circuit 86 is also operatively coupled through single pole-double throw (SPDT) switch 89 to the inverse determination circuit 52 and the output port of the recursive covariance matrix determination circuit 82. The coupling to the covariance matrix determination circuit effectively provides a feedback loop which updates the signals generated in the processing circuit based upon new relative range (x) and velocity (y) data provided to the system. The scaler mixer circuit 86 receives a signal $P_{N-1}$ from the inverse determination circuit 66 of the direct least squares determination circuit 52 during a first iteration. Thereafter for each successive iteration, the scaler matrix circuit receives the output of the covariance matrix generator circuit at the third input port and generates a scaler mixer circuit output signal $C_N^{-1}$.

Coupled to the scaler mixer circuit is a scaler combiner circuit 90 having at least two input ports and an output port. The scaler combiner circuit receives the scaler mixer circuit output signal at a first input port and a signal corresponding to a "1" preferably generated by voltage source 91 at the second input port. In response thereto, the scaler combiner circuit combines the scaler mixer circuit output signal and the voltage source output signal and generates an output signal.

Coupled to the scaler combiner circuit 90 is a scaler inverse determination circuit 92. The scaler inverse determination circuit receives the scaler combiner circuit output signal and generates an inverse determination circuit output signal which corresponds to a scaler determination circuit output signal ($C_N$), where:

$$C_N = \frac{1}{1 + H_N{}^t P_{N-1} H_N}$$

As shown in FIG. 7, the processing circuit 76 also includes a recursive gain determination circuit 80 operatively coupled to the output port of the scaler determination circuit 78. In a preferred embodiment of the invention, the recursive gain determination circuit includes a mixer circuit 94 having at least three input ports and an output port. Preferably, the mixer circuit first input port is coupled to the SPDT switch 89 for receiving a covariance matrix generator circuit output signal ($P_{N-1}$), the mixer circuit second input port is coupled to the inverse determination circuit 92 for receiving the gain determination circuit output signal ($C_N$), and the mixer circuit third input port is coupled to recursive vector determination circuit 70 for receiving the vector determination circuit output signal ($H_N$). In response to these input signals, the gain mixer circuit 94 generates an output signal corresponding to a gain determination circuit output signal ($K_N$) indicative of a difference between the prior position of the target being monitored and its current position where:

$$K_N = P_{N-1} H_N C_N$$

Operatively coupled to the output port of the gain determination circuit 80 is a covariance matrix generator circuit 82. In a preferred embodiment of the invention, the covariance matrix generator circuit includes a first covariance mixer circuit 96 having at least two input ports and an output port. Preferably, a first input port of the first covariance mixer circuit is coupled to the output port of the gain determination circuit 80 and a second input port is coupled to the scaler transpose circuit 88 for receiving the scaler transpose circuit output signal ($H_N^t$). In response to the input signals received, the first covariance mixer circuit 96 combines the two input signals and provides a first covariance mixer circuit output signal ($K_N H_N^t$) at its output port.

Operatively coupled to the first covariance mixer circuit output port is a covariance combiner circuit 98 having first and second input ports and an output port. The covariance combiner circuit first input port receives the first covariance mixer circuit output signal ($K_N H_N^t$) while the covariance combiner circuit second input port receives the voltage source 91 output signal which corresponds to a "1". In response, the covariance combiner circuit effectively combines the signal received at the second input port with a negative representation of the covariance mixer circuit output signal to provide a covariance combiner circuit output signal ($1-K_N H_N^t$).

Operatively coupled to the output port of the covariance combiner circuit 98 is second covariance mixer circuit 100 having at least two input ports and an output port. Preferably, the first input port of the second covariance mixer circuit is coupled to the covariance combiner circuit output port for receiving the covariance combiner circuit output signal ($1-K_N H_N^t$) and the second input port of the second covariance mixer circuit is coupled to the SPDT switch 89 for receiving a covariance matrix generator circuit output signal ($P_{N-1}$). The second covariance mixer circuit combines the two signals provided thereto and provides a second covariance mixer circuit output signal corresponding to a covariance matrix determination circuit output signal ($P_N$) where $$P_N = (1 - K_N h_N^t) P_{N-1}$$

In the preferred embodiment of the invention, the processing circuit 76 also includes the delay circuit 84 operatively coupled to the output of the second covariance mixer circuit for receiving the covariance matrix generator circuit output signal ($P_N$). The delay circuit effectively postpones the presentment of the covariance matrix generator circuit output signal ($P_N$) to the scaler generator circuit 78, the gain determination circuit 80 and the covariance matrix generator circuit 82 so that the covariance matrix generator circuit output signal of the immediately previous iteration ($P_{N-1}$) can be utilized during the subsequent iteration.

Referring again to FIG. 6, the Kalman filter circuit further includes a second recursive mixer circuit 102. The second recursive mixer circuit preferably includes at least two input ports and an output port. The first and second input ports of the second recursive mixer circuit are respectively operatively coupled to the output port of the first recursive combiner circuit 75 and the output port of the processing circuit 76. The second recursive mixer circuit preferably receives the first recursive combiner circuit output signal ($Y_N - H_N^t B_{N-1}$) and the gain determination circuit output signal $K_N$. In response, the second recursive mixer circuit combines the signals provided thereto and generates a second recursive mixer circuit output signal [$K_N (Y_N - H_N^t B_{N-1})$] indicative of an adjustment or correction of the preceding set of regression coefficients ($B_{N-1}$) based on the most current velocity and range sample value signals.

The Kalman filter also preferably includes a second recursive combiner circuit 104, having at least two input ports. The first input port of the second recursive combiner circuit is coupled to the second recursive mixer circuit 102 while the second input port is coupled through a delay circuit 106, to the second recursive combiner circuit output port and to switch 74 for providing the delayed signal ($B_{N-1}$) to the first recursive mixer circuit 72. The second recursive combiner circuit output port provides a signal ($B_N$), indicative of a prediction of the regression coefficients of a second order or higher polynomial that characterizes the relationship of relative range and velocity of the target being monitored. The second recursive combiner circuit output signal can thereafter be provided to the data recorder 31 for reconstructing the movement of the corresponding target at a later date.

The operation of the apparatus for motion detection and tracking of objects in a region for collision avoidance will now be described. First and second detection signals are preferably generated in the first and second signal generators 6,8 and provided to the signal transmitter 4. The signal transmitter may amplify, process and combine first and second detection signals before providing the signals to antenna 10 for transmission to a spatial region proximate the vehicle. Preferably, the signal transmitter 4 combines the first and second detection signals by modulation or multiplexing. Typically, the detection signal transmitted by the antenna has a field of view of approximately 4° in azimuth and a field of view of approximately 5° in elevation.

After transmission, the first and second detection signals, which as previously stated have substantially different frequencies, are at least partially reflected off objects (i.e., targets) in the field of view. These objects may include other vehicles, animals, road obstructions, abutments and the like. If an object is in the system's field of view, at least a portion of the signal reflects back to antenna 10 which provides the received detection signals to signal receiver 12. The signal receiver processes the received detection signals (i.e., including amplification) and provides the first and second detection signal to switch 14. The switch is preferably designed to separate the first detection signal from the second detection signal and provide each detection signal at a respective output port of the switch.

Two switch output signals (i.e., first and second object parameter signals), corresponding to the first and second detection signals, are provided by the switch 14 to a low pass filter 16 for removing noise and unwanted signal components. The signals provided by the low pass filter are forwarded to an analog to digital (A/D) converter 18 which converts the continuous radio frequency (rf) signals to digital signals (i.e., a digitized form of the continuous rf signal). The digital first and second A/D converter output signals are thereafter provided to a Fourier transform circuit 20 which transforms the time domain signal (the received first and second detection signals corresponding to the first and second object parameter signals) to respective frequency domain signals. From the frequency domain signals, the velocity and range of the object being monitored are respectively determined by the velocity and range finder circuit 22 which identifies the peak amplitude of one of the first and second object parameter signals and determines the difference between the first and second object parameter signals.

The output signal of the velocity and range finder circuit is thereafter provided to the adaptive probabilistic neural network (APNN) 28. The APNN determines whether a new data sample (velocity and range data) can be properly associated with a prior data sample or whether the new data sample corresponds to a new object in the system's field of view. By utilizing the APNN, it is possible to associate new data samples (velocity and range data) corresponding to objects in the antenna's field of view based upon previous velocity and range data to track the trend of the target's velocity and range. Therefore, it is possible to determine if an object is moving away from the vehicle at an increasing rate and therefore the threat of collision is decreasing, whether an object is moving toward the vehicle at an increasing rate and therefore a threat of collision is increasing, or whether the range between the vehicle and the target is static because the relative velocity is zero and therefore the threat of collision is unchanged.

The APNN sorts current data samples as they are provided to the target prediction and collision warning system based upon previous locations of targets in the system's field of view. Specifically, the APNN analyses the sample data, groups sample data (relative range and velocity data) that can be associated with a particular target, and assigns the relative range and velocity data to a corresponding cluster processor of the APNN.

The output of each cluster processor is preferably coupled to one of a plurality of target tracker circuits 30. Each target tracker circuit receives the relative velocity and relative range data of each target that has been sorted by the APNN to a corresponding cluster processor. The target tracker generates regression coefficient signals corresponding to regression coefficients for each target being tracked based upon new sample data and previously received sample data of a corresponding target. The regression coefficient signals correspond to coefficients of a polynomial which defines a relationship between the relative range and velocity of a target being tracked by the system.

In a preferred embodiment of the invention, the target tracker circuit 30 includes a direct least squares determination circuit 52 and a Kalman filter circuit 54 coupled to the output port of each cluster processor of the APNN. The target tracker circuit is not activated until at least three data samples of at least one target have been sorted by the APNN. Once the APNN receives and sorts three data samples corresponding to a particular target, the three data samples are provided to the direct least squares determination circuit 52 of the target tracker circuit. The direct least squares circuit utilizes the three data samples and the aforementioned linear regression equation ($y=a+bx+cx^2+v$) to determine the set of regression coefficients (a,b,c) that provide a "best fit" for the three data samples. Once the regression coefficients corresponding to the direct least squares determination circuit output signal (i.e., regression coefficient signal) have been determined, the regression coefficients are updated by the Kalman filter circuit (recursive least squares determination circuit) 54 for each subsequent sample data received for each respective target.

When at least a fourth data sample corresponding to a particular target is received and sorted by the APNN, the set of sorted data samples are provided to the recursive least squares determination circuit wherein a new set of regression coefficients (recursive least squares determination circuit output signal) are determined utilizing the aforementioned method. This determination of a new set of regression coefficients occurs for each new data sample. As a result, the regression coefficients are continually refined and reestimated so that more accurate coefficients describing the prior range and velocity of the target and a better estimate of the future movements of the target are obtained. In view of the generation of the regression coefficients, the system need not store each data sample to chart the relative movement of targets during a particular time period. Instead, only the regression coefficients need be stored for plotting relative velocity vs. relative range on a chart or for computer simulated reconstruction. These coefficients can thereafter be stored in the data recorder 31 and provided to the direct least squares determination circuit for "off-line" reconstruction of the movements of targets.

The target prediction and collision warning system and method of the present invention provides a system which is better able to track objects in the system's field of view than prior art systems. This is because the present system calculates, updates and maintains regression coefficients of a second order polynomial which describes the relationship of target's relative range and velocity. Therefore, if a data sample is "lost" (i.e., due to noise or mismeasurement) during processing, the system can utilize interpolation using the coefficients calculated with past data samples to predict the current and future characteristics of the target (range and velocity) in order to provide the vehicle operator with an indication of whether an accident is more likely to occur than during the last sample period.

The system of the present invention is superior to the prior art systems because the system need not continually receive range and velocity data in order to continue tracking targets. If a target being tracked temporarily leaves the system's field of view, the system will continue to store the coefficients which describe the particular target's relative range and speed for a period of time. When the target returns to the field of view, the system will be able to associate the returning target with its previous range and velocity measurements because the present invention can extrapolate the range and velocity of the target during future time periods by plotting the second order polynomial using the regression coefficients. Therefore, target range and velocity data is not as readily lost as in prior art systems. This is very beneficial for off-line accident reconstruction.

The target prediction and collision warning system of the present invention is superior to prior art systems because target range and velocity data is effectively maintained while individual data may be overwritten. This is attributed to the fact that the regression coefficients incorporate all prior target data and provide a very close approximation to the actual target range and velocity data. This is provided without the enormous memory requirement for storing each entry that was required by prior art systems. The use of regression coefficients effectively compresses the range and velocity data for ease in storage, manipulation and off-line reconstruction.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A target prediction and collision warning system for detecting targets in a spatial region about a vehicle, the system comprising:

a) a signal transmitter providing at least first and second detection signals to the spatial region, the at least first and second detection signals at least partially reflecting off at least one object within the spatial region thereby generating at least partially reflected first and second detection signals, each of the at least partially reflected first and second detection signals being indicative of at least one characteristic of the at least one object within the spatial region;

b) a signal receiver operatively coupled to the signal transmitter, the signal receiver receiving each of the at least partially reflected first and second detection signals, each of the at least partially reflected first and second detection signals corresponding to first and second object parameter signals;

c) a target tracker circuit operatively coupled to the signal receiver, the target tracker circuit being responsive to at least one of the first and second object parameter signals and providing a regression parameter signal indicative of at least one of a past, current and future value of the at least one characteristic of the at least one object within the spatial region whereby the present and future position of a target within a spatial region may be predicted and imminent collision with the vehicle indicated, the regression parameter signal comprising regression coefficients that fit a second or higher order polynomial, whereby through data extrapolation the at least one of a past, current and future value of the at least one characteristic may be recreated; and d) a data recorder operatively coupled to the target tracker circuit, the data recorder receiving and storing the coefficients for future evaluation whereby post-collision reconstruction of the targets' relative trajectory may be facilitated.

2. A target prediction and collision warning system as defined by claim 1, further comprising a probabilistic neural network operatively coupled between the signal receiver and the target tracker, the probabilistic neural network receiving the first and second object parameter signals and providing a probabilistic neural network output signal indicative of the at least one characteristic of the at least one object within the spatial region.

3. A target prediction and collision warning system as defined by claim 2, wherein the probabilistic neural network comprises:

a) a plurality of cluster processor circuits receiving the first and second object parameter signals, each cluster processor circuit generating an output signal representing a probability density function estimation value corresponding to the first and second object parameter signals, each cluster processor circuit including:

1) an input buffer memory circuit having a plurality of serially connected registers for storing the first and second object parameter signals assigned to a respective cluster processor circuit;

2) a plurality of processing elements, each of the plurality of processing elements being operatively coupled to a respective register of the input buffer memory circuit being responsive to assigned first and second object parameter signals stored in the input buffer memory circuit, each of the processing elements further being responsive to current unassigned first and second object parameter signals and providing a processing element output signal in response thereto;

3) a plurality of exponential function circuits, each of the plurality of exponential function circuits being coupled to a corresponding processing element, each of the plurality of exponential function circuits performing an exponential function on the processing element output signal and providing an exponential function circuit output signal in response thereto; and 4) a combiner circuit coupled to each of the plurality of exponential function circuits of the respective cluster processor circuit, the combiner circuit being responsive to the exponential function circuit output signals, performing an addition function thereon and providing an output signal representing a probability density function estimation value for each unassigned first and second object parameter signal;

b) a decision logic circuit operatively coupled to the combiner circuit of each cluster processor circuit, the decision logic circuit comparing the combiner circuit output signal of the corresponding cluster processor circuit with at least a first threshold value signal, and providing a decision address signal in response thereto; and c) a switching circuit operatively coupled to the decision logic circuit and to each of the cluster processor circuits, the switching circuit further being responsive to current unassigned first and second object parameter signals and assigning the current unassigned first and second object parameter signals to the input buffer memory circuit of the respective cluster processor circuit in response to the decision address signal provided the decision logic circuit.

4. A target prediction and collision warning system for detecting targets in a spatial region about a vehicle, the system comprising:

a signal transmitter providing at least first and second detection signals to the spatial region, the at least first and second detection signals at least partially reflecting off at least one object within the spatial region thereby generating at least partially reflected first and second detection signals, each of the at least partially reflected first and second detection signals being indicative of at least one characteristic of the at least one object within the spatial region;

a signal receiver operatively coupled to the signal transmitter, the signal receiver receiving each of the at least partially reflected first and second detection signals, each of the at least partially reflected first and second detection signals corresponding to first and second object parameter signals; and a target tracker circuit operatively coupled to the signal receiver, the target tracker circuit comprises a Kalman filter circuit, the Kalman filter circuit further comprising:

a recursive vector determination circuit operatively coupled to the signal receiver, the recursive vector determination circuit being responsive to the second object parameter signal and generating a recursive vector determination circuit output signal in response thereto;

a first recursive mixer circuit operatively coupled to the recursive vector determination circuit, the first recursive mixer circuit being responsive to the recursive vector determination circuit output signal and regression parameter signal, the first recursive mixer circuit effectively combining the recursive vector determination circuit output signal and an initial regression parameter signal and providing a first recursive mixer circuit output signal in response thereto;

a first recursive combiner circuit operatively coupled to the first recursive mixer circuit and being responsive to the first recursive mixer circuit output signal, the first recursive combiner circuit also being operatively coupled to the signal receiver and being responsive to the first object parameter signal, the first recursive combiner circuit effectively combining the first recursive mixer circuit output signal and the first object parameter signal and providing a first recursive combiner circuit output signal in response thereto;

a processing circuit operatively coupled to the recursive vector determination circuit and being responsive to the recursive vector determination circuit output signal and providing a processing circuit output signal in response thereto;

a second recursive mixer circuit operatively coupled to the first recursive combiner circuit and the processing circuit, the second recursive mixer circuit being responsive to and combining the first combiner circuit output signal and the processing circuit output signal, the second mixer circuit providing an output signal in response thereto; and a second recursive combiner circuit operatively coupled to the second recursive mixer circuit, the second recursive combiner circuit being responsive to and combining the second recursive mixer circuit output signal and the regression parameter signal and providing an output signal indicative of an updated regression parameter signal corresponding to an output signal of the Kalman filter circuit, the Kalman filter circuit being responsive to at least one of the first and second object parameter signals and providing a regression parameter signal indicative of at least one of a past, current and future value of the at least one characteristic of the at least one object within the spatial region whereby the present and future position of a target within a spatial region may be predicted and imminent collision with the vehicle indicated.

5. A target prediction and collision warning system as defined by claim 4 which further comprises:

a delay circuit operatively coupled to the output port of the second recursive combiner circuit and receiving an updated regression parameter signal and generating the regression parameter signal, the delay circuit also being operatively coupled to the first recursive mixer circuit, the delay circuit providing the regression parameter signal to the first recursive mixer circuit and the second recursive combiner circuit.

6. A target prediction and collision warning system as defined by claim 4, wherein the processing circuit comprises:

a recursive scaler determination circuit operatively coupled to the recursive vector determination circuit, the recursive scaler determination circuit being responsive to and combining the recursive vector determination circuit output signal and a delayed covariance matrix signal and providing a recursive scaler determination circuit output signal in response thereto;

a recursive gain determination circuit operatively coupled to the recursive scaler determination circuit, the recursive gain determination circuit being responsive to the recursive scaler determination circuit output signal and providing a recursive gain determination circuit output signal corresponding to the processing circuit output signal in response thereto;

a covariance matrix determination circuit operatively coupled to the recursive gain determination circuit, the covariance matrix determination circuit being responsive to the recursive gain determination circuit output signal and providing a covariance matrix determination circuit output signal in response thereto; and a delay circuit operatively coupled to the covariance matrix determination circuit and being responsive to the covariance matrix determination circuit output signal, the delay circuit also being operatively coupled to the recursive scaler determination circuit, the delay circuit effectively providing the delayed covariance matrix signal to the recursive scaler determination circuit.

7. A target prediction and collision warning system as defined by claim 6, wherein the recursive scaler determination circuit comprises:

a transpose circuit operatively coupled to recursive vector determination circuit, the transpose circuit being responsive to the recursive vector determination circuit output signal and generating a vector transpose circuit output signal, a scaler mixer circuit operatively coupled to the transpose circuit and being responsive to the vector transpose circuit output signal, the scaler mixer circuit also being operatively coupled to the recursive vector determination circuit and being responsive to the recursive vector determination circuit output signal, the scaler mixer circuit also being coupled to the delay circuit and being responsive to the delayed covariance matrix signal, the scaler mixer circuit effectively combining the vector transpose circuit output signal, the recursive vector determination circuit output signal and the delayed covariance matrix signal and providing a scaler mixer circuit output signal in response thereto, a scaler combiner circuit operatively coupled to the scaler mixer circuit and being responsive to the scaler mixer circuit output signal, the scaler combiner circuit also being responsive to a second signal as an input signal, the scaler combiner circuit effectively combining the scaler mixer circuit output signal and the second signal and providing a scaler combiner circuit output signal in response thereto; and an inverse determination circuit coupled to the scaler combiner circuit, the inverse determination circuit being responsive to the scaler combiner circuit output signal and providing an inverse determination circuit output signal in response thereto corresponding to the recursive scaler determination circuit output signal.

8. A target prediction and collision warning system as defined by claim 7, wherein the recursive gain determination circuit comprises:

a recursive gain mixer circuit operatively coupled to the transpose circuit and being responsive to the vector transpose circuit output signal, the recursive gain mixer circuit also being operatively coupled to the inverse determination circuit and being responsive to the recursive scaler determination circuit output signal, the recursive gain mixer circuit also being operatively coupled to the delay circuit and being responsive to the delayed covariance matrix signal, the gain mixer circuit effectively mixing the vector transpose circuit output signal, the inverse determination circuit output signal and the delayed covariance matrix signal and providing a gain mixer circuit output signal indicative of a signal gain factor in response thereto.

9. A target prediction and collision warning system as defined by claim 6, wherein the covariance matrix determination circuit comprises:

an output port;

a first covariance mixer circuit operatively coupled to the gain mixer circuit and being responsive to the gain mixer circuit output signal, the first covariance mixer circuit also being operatively coupled to the transpose circuit and being responsive to the vector transpose circuit output signal, the first covariance mixer circuit effectively mixing the gain mixer circuit output signal and the transpose circuit output signal and providing a first covariance mixer circuit output signal in response thereto;

a covariance combiner circuit operatively coupled to the first covariance mixer circuit and being responsive to the first covariance mixer circuit output signal, the covariance combiner circuit also being responsive to the second signal as an input signal, the covariance combiner circuit effectively combining the first covariance mixer circuit output signal and the second signal and providing a covariance combiner circuit output signal in response thereto; and a second covariance mixer circuit operatively coupled to the covariance combiner circuit and being responsive to the covariance combiner circuit output signal, the second covariance mixer circuit also being operatively coupled to the delay circuit and being responsive to the delayed covariance matrix signal, the covariance matrix determination circuit effectively combining covariance combiner circuit output signal and the delayed covariance matrix signal and generating a covariance matrix determination output signal in response thereto.

10. A target prediction and collision warning system as defined by claim 4, further comprising a data recorder operatively coupled to the second recursive combiner circuit, wherein the output signal of the Kalman filter circuit comprises regression coefficients describing the relationship of relative range and velocity of at least one target in the spatial region, the data recorder receiving and storing the coefficients for future evaluation.

11. A target prediction and collision warning system for detecting targets in a spatial region about a vehicle comprising:

a) a signal transmitter providing at least first and second detection signals to the spatial region, the at least first and second detection signals at least partially reflecting off at least one object within the spatial region thereby generating at least partially reflected first and second detection signals, each of the at least partially reflected first and second detection signals being indicative of at least one characteristic of the at least one object within the spatial region;

(b) a signal receiver operatively coupled to the signal transmitter, the signal receiver receiving each of the at least partially reflected first and second detection signals, each of the at least partially reflected first and second detection signals corresponding to the first and second object parameter signals;

c) a target tracker circuit operatively coupled to the signal receiver, the target tracker circuit comprises a direct least squares determination circuit, the direct least squares determination circuit further comprising:

a direct vector determination circuit operatively coupled to the signal receiver, the direct vector determination circuit being responsive to at least one of the second object parameter signals and generating a direct vector determination circuit output signal in response thereto;

a matrix determination circuit operatively coupled to the signal receiver and being responsive to at least one of the first object parameter signals and generating a matrix determination output signal in response thereto;

a matrix transposition circuit operatively coupled to the matrix determination circuit and receiving the matrix determination circuit output signal and generating a matrix transposition circuit output signal in response thereto corresponding to a transpose function of the matrix determination circuit output signal;

a first direct mixer circuit operatively coupled to the matrix determination circuit and the matrix transposition circuit, the first direct mixer circuit effectively combining the matrix determination circuit output signal and the matrix transposition circuit output signal and providing a first direct mixer output signal in response thereto;

a second direct mixer circuit operatively coupled to the direct vector determination circuit and the matrix transposition circuit, the second direct mixer circuit being responsive to and combining the direct vector determination circuit output signal and the matrix transposition circuit output signal and providing a second direct mixer circuit output signal in response thereto;

an inverse determination circuit operatively coupled to the first direct mixer circuit and being responsive to the first direct mixer circuit output signal, the inverse determination circuit generating and providing an output signal corresponding to an inverse matrix function of the first direct mixer circuit output signal in response thereto;

a third direct mixer circuit operatively coupled to the inverse determination circuit and the second direct mixer circuit, the third direct mixer circuit being responsive to and combining the second direct mixer circuit output signal and the inverse determination circuit output signal and providing a third direct mixer circuit output signal in response thereto, the third direct mixer circuit output signal corresponding to a direct least squares determination circuit signal, the least squares determination circuit being responsive to at least one of the first and second object parameter signals and providing a regression parameter signal indicative of at least one of a past, current and future value of the at least one characteristic of the at least one object within the spatial region, whereby the present and future position of a target within a spatial region may be predicted and imminent collision warning indicated.

12. A target prediction and collision warning system as defined by claim 11, wherein the target tracker further comprises a recursive least squares determination circuit coupled to the direct least squares determination circuit, the recursive least squares determination circuit being responsive to the direct least squares determination circuit signal and the first and second object parameter signals and providing a current regression parameter signal.

13. A target prediction and collision warning system as defined by claim 12, wherein the recursive least squares determination circuit comprises:

a recursive vector determination circuit operatively coupled to the signal receiver, the recursive vector determination circuit being responsive to the second object parameter signal and generating a recursive vector determination circuit output signal in response thereto;

a first recursive mixer circuit operatively coupled to the recursive vector determination circuit, the first recursive mixer circuit being responsive to the recursive vector determination circuit output signal and regression parameter signal, the first recursive mixer circuit combining the recursive vector determination circuit output signal and the initial regression parameter signal and providing a first recursive mixer circuit output signal in response thereto;

a first recursive combiner circuit operatively coupled to the first recursive mixer circuit and being responsive to the first recursive mixer circuit output signal, the first recursive combiner circuit also being operatively coupled to the signal receiver and being responsive to the first object parameter signal, the first recursive combiner circuit effectively combining the first recursive mixer circuit output signal and the first object parameter signal and providing a first recursive combiner circuit output signal in response thereto;

a processing circuit operatively coupled to the recursive vector determination circuit and being responsive to the recursive vector determination circuit output signal and providing a processing circuit output signal in response thereto;

a second recursive mixer circuit operatively coupled to the first recursive combiner circuit and the processing circuit, the second recursive mixer circuit being responsive to and combining the first recursive combiner circuit output signal and the processing circuit output signal, the second mixer circuit providing an output signal in response thereto; and a second recursive combiner circuit operatively coupled to the second recursive mixer circuit, the second recursive combiner circuit having an output port corresponding to an output port of the recursive least squares determination circuit, the second recursive combiner circuit being responsive to and combining the second recursive mixer circuit output signal and the regression parameter signal and providing an output signal indicative of an updated regression parameter signal.

14. A target prediction and collision warning system as defined by claim 13, wherein the recursive least squares determination circuit further comprises:

a delay circuit operatively coupled to the second recursive combiner circuit output port and being responsive to the updated regression parameter signal and generating the regression parameter signal, the delay circuit also being operatively coupled to the first recursive mixer circuit, the delay circuit providing the regression parameter signal to the first recursive mixer circuit and the second recursive combiner circuit.

15. A target prediction and collision warning system as defined by claim 13, wherein the processing circuit comprises:

a recursive scaler determination circuit operatively coupled to the recursive vector determination circuit, the recursive scaler determination circuit being responsive to and combining the recursive vector determination circuit output signal and a delayed covariance matrix signal and providing a recursive scaler determination circuit output signal in response thereto;

a recursive gain determination circuit operatively coupled to the recursive scaler determination circuit, the recursive gain determination circuit being responsive to the recursive scaler determination circuit output signal and providing a recursive gain determination circuit output signal in response thereto corresponding to the processing circuit output signal in response thereto;

a covariance matrix determination circuit operatively coupled to the recursive gain determination circuit, the covariance matrix determination circuit being responsive to the recursive gain determination circuit output signal and providing a covariance matrix determination circuit output signal in response thereto; and a delay circuit operatively coupled to the covariance matrix determination circuit and being responsive to the covariance matrix determination circuit output signal, the delay circuit also being operatively coupled to the recursive scaler determination circuit, the delay circuit providing the delayed covariance matrix signal to the recursive scaler determination circuit.

16. A target prediction and collision warning system as defined by claim 15, further comprising:

a switching circuit operatively coupled to the direct least square determination circuit and to the covariance matrix determination circuit, the switching circuit also being coupled to at least one of the recursive scaler determination circuit, the gain determination circuit and the covariance matrix determination circuit, the switching circuit selectively coupling the at least one of the recursive scaler determination circuit, the gain determination circuit and the covariance matrix determination circuit to one of the direct least squares determination circuit and the covariance matrix determination circuit.

17. A method of detecting and tracking motion of objects in a spatial region proximate to a vehicle for collision avoidance, the method comprising the steps of:

a) transmitting at least first and second detection signals for at least partial reflection by at least one object in the spatial region thereby generating at least partially reflected first and second detection signals;

b) detecting the at least partially reflected first and second detection signals, the at least partially reflected first and second detection signals corresponding to first and second object parameter signals;

c) combining the first and second parameter signals to generate a regression parameter signal indicative of at least one of a post, current and future characteristic of the at least one object by the further steps of:
  1) obtaining at least three sample value signals for each of the first and second object parameter signals;
  2) generating a direct least squares signal utilizing the at least three sample value signals for each of the first and second object parameter signals, the direct least squares signal corresponding to an initial estimate of the regression parameter signal;
  3) obtaining at least a fourth sample value signal for each of the first and second object parameter signals;
  4) generating a recursive least squares signal utilizing the direct least squares signal, the at least three sample value signals and the at least fourth sample value signal for each of the first and second object parameter signals, the recursive least squares signal corresponding to the regression parameter signal, the generation of the recursive least squares signal further comprising the steps of:
    A) generating a first object parameter vector signal utilizing the at least three sample value signals and the at least fourth sample value signal for the first object parameter signal;
    B) mixing the first object parameter vector signal and the direct least squares signal to provide a first mixed signal;
    C) generating a second object parameter vector signal utilizing the at least three sample value signals and the at least fourth sample value signal for the first object parameter signal;

D) combining the first mixed signal and the second object parameter vector signal;

E) generating a difference signal indicative of a difference between the at least three sample value signals of the first and second object parameter signals and the at least fourth sample value signal of the first and second object parameter signals;

F) mixing the difference signal and the first combiner circuit output signal to provide a second mixed signal; and G) combining the second mixed signal and the direct least squares signal to provide the recursive least squares signal, the recursive least squares signal indicative of at least one of the present and future position of a target within a spatial region whereby imminent collision warning may be indicated to facilitate collision avoidance.

18. A method as defined by claim 17, which further comprises:

generating an updated recursive least squares signal based upon the at least three sample value signals, the at least fourth sample value signals and at least a fifth sample value signal for the at least first and second object parameter signals.

19. A method as defined by claim 18, further comprising:

generating an updated second object parameter signal based upon the at least three sample value signals, the at least fourth sample value signals and at least a fifth sample value signal for the at least second parameter signals;

mixing the updated second object parameter signal with the recursive least squares signal to provide an updated first mixed signal;

generating an updated first object parameter signal utilizing the at least three sample value signals, the at least fourth sample value signal and a fifth sample value signal for the at least first parameter signals;

combining the updated first mixed signal and the updated first object parameter signal to provide an updated first combined signal;

generating an updated signal indicative of difference between the at least three and fourth sample value signals of the first and second object parameter signals and the at least fifth sample value signals of the first and second object parameter signals;

mixing the updated signal and the updated first combiner circuit output signal to provide an updated second mixed signal; and combining the updated second mixed signal and the recursive least squares signal to provide an updated second combined signal corresponding to an updated recursive least squares signal.

20. A method as defined by claim 17, wherein step (2) further comprises:

generating a second object parameter vector signal utilizing the at least three sample value signals for the second object parameter signal;

generating a first object parameter matrix signal utilizing the at least three sample value signals for the first object parameter signal;

generating a first object parameter transposition matrix signal utilizing the first object parameter matrix signal indicative of a transpose matrix function of the first object parameter matrix signal;

combining the first object parameter matrix signal and the first object parameter transposition matrix signal to provide a first mixed signal;

combining the first object parameter transposition matrix signal and the first object parameter matrix signal to provide a second mixed signal;

generating an inverse matrix signal utilizing the first mixed signal;

combining the inverse matrix signal and the second mixed signal to provide a third mixed signal corresponding to the direct least square signal.

21. A method as defined by claim 17, wherein the recursive least squares signal comprises regression coefficients describing the relationship of the relative range and velocity of a target in a spatial region and the method further includes the step of recording the coefficients for future evaluation.

* * * * *